(12) United States Patent
Steller

(10) Patent No.: US 10,785,344 B2
(45) Date of Patent: *Sep. 22, 2020

(54) COMPUTERIZED SYSTEM AND METHOD FOR AUTOMATICALLY COMMUNICATING CONDITIONAL MESSAGES WITHIN A MOBILE APPLICATION ENVIRONMENT

(71) Applicant: Taap Development, Inc., Manhattan Beach, CA (US)

(72) Inventor: Eric Steller, Manhattan Beach, CA (US)

(73) Assignee: TAPP DEVELOPMENT, INC., Manhattan Beach, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/143,767

(22) Filed: Sep. 27, 2018

(65) Prior Publication Data

US 2019/0028412 A1 Jan. 24, 2019

Related U.S. Application Data

(63) Continuation of application No. 15/385,129, filed on Dec. 20, 2016, now Pat. No. 10,129,189.

(51) Int. Cl.
*H04L 12/58* (2006.01)
*H04L 29/08* (2006.01)
*H04W 4/14* (2009.01)

(52) U.S. Cl.
CPC ............ *H04L 67/306* (2013.01); *H04L 51/14* (2013.01); *H04L 51/38* (2013.01); *H04L 67/1095* (2013.01); *H04L 67/20* (2013.01); *H04W 4/14* (2013.01); *H04L 67/18* (2013.01)

(58) Field of Classification Search
USPC .......................... 709/206, 220, 229, 227, 226
See application file for complete search history.

(56) References Cited

U.S. PATENT DOCUMENTS

| 8,386,449 B2 * | 2/2013 | Hartman ................ G06Q 30/02 707/704 |
| 9,055,023 B2 | 6/2015 | Murphy et al. |
| 9,317,672 B2 | 4/2016 | Carlson |
| 9,367,217 B2 | 6/2016 | Moore, Jr. |

(Continued)

*Primary Examiner* — Jude Jean Gilles
(74) *Attorney, Agent, or Firm* — James J. DeCarlo; Greenberg Traurig, LLP

(57) ABSTRACT

Disclosed are systems and methods for improving interactions with and between computers in content searching, generating, hosting and/or providing systems supported by or configured with personal computing devices, servers and/or platforms. The systems interact to identify and retrieve data within or across platforms, which can be used to improve the quality of data used in processing interactions between or among processors in such systems. The disclosed systems and methods provide an improved messaging platform that enables the creation and communication of locked electronic messages to recipients, where the message is automatically unlocked for recipient viewing only upon satisfaction of a real-world condition set by the sending user. Upon creating the message, the sender sets time, date and/or geographical restrictions for viewing the message, such that only upon those set restrictions being satisfied is the message delivered and viewable on the recipient user's device.

20 Claims, 15 Drawing Sheets

(56) References Cited

U.S. PATENT DOCUMENTS

| | | | |
|---|---|---|---|
| 9,773,037 B2 | 9/2017 | Reich et al. | |
| 9,802,121 B2* | 10/2017 | Ackley | A63F 13/216 |
| 9,895,616 B2* | 2/2018 | Schindler | A63F 13/87 |
| 10,037,636 B2* | 7/2018 | Ho | G07C 9/00571 |
| 10,129,189 B2* | 11/2018 | Steller | H04L 67/306 |
| 2002/0091815 A1* | 7/2002 | Anderson | G06Q 10/06 709/223 |
| 2004/0199284 A1* | 10/2004 | Hara | G07C 9/00103 700/215 |
| 2007/0130274 A1 | 6/2007 | Lee et al. | |
| 2012/0095911 A1* | 4/2012 | Ibasco | G06Q 20/10 705/39 |
| 2012/0213362 A1* | 8/2012 | Bliding | G07C 9/00309 380/44 |
| 2013/0110881 A1* | 5/2013 | Bender | G06F 16/254 707/792 |
| 2013/0147626 A1 | 6/2013 | Hammoud | |
| 2013/0226872 A1* | 8/2013 | Barefoot | G06F 16/27 707/638 |
| 2015/0364937 A1* | 12/2015 | Becerra | H02J 7/0085 320/101 |
| 2017/0064261 A1 | 3/2017 | Peng et al. | |
| 2017/0195274 A1* | 7/2017 | Liberty | H04L 51/22 |

\* cited by examiner

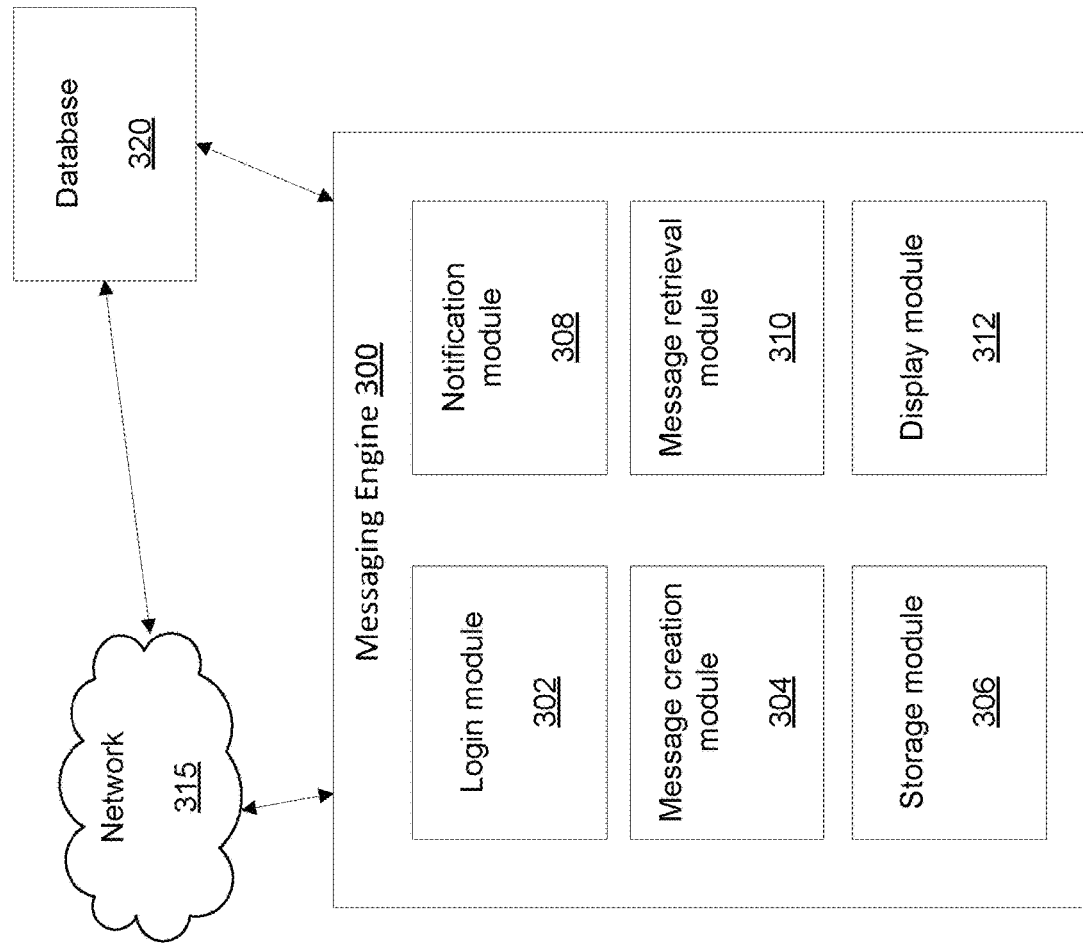

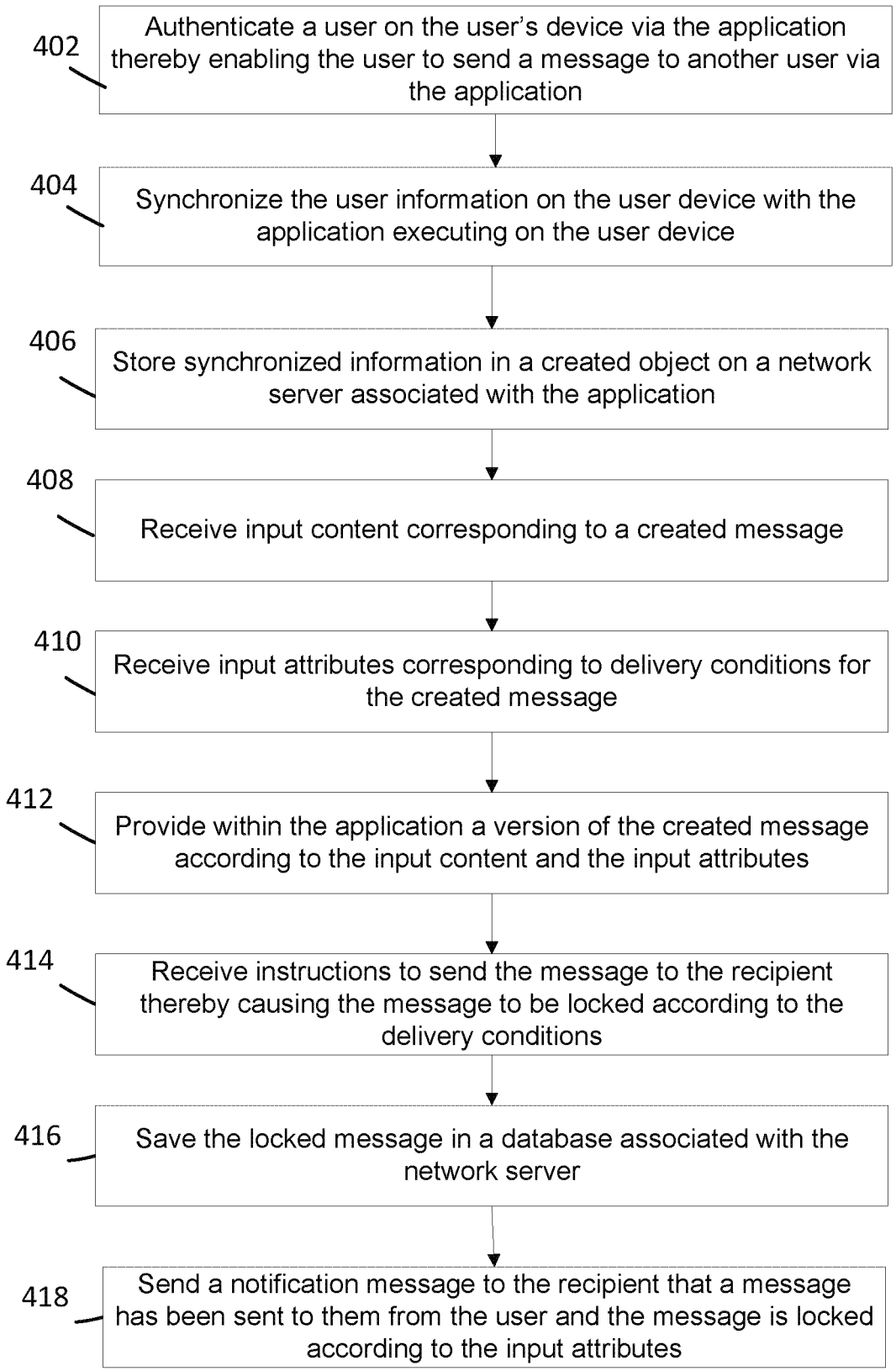

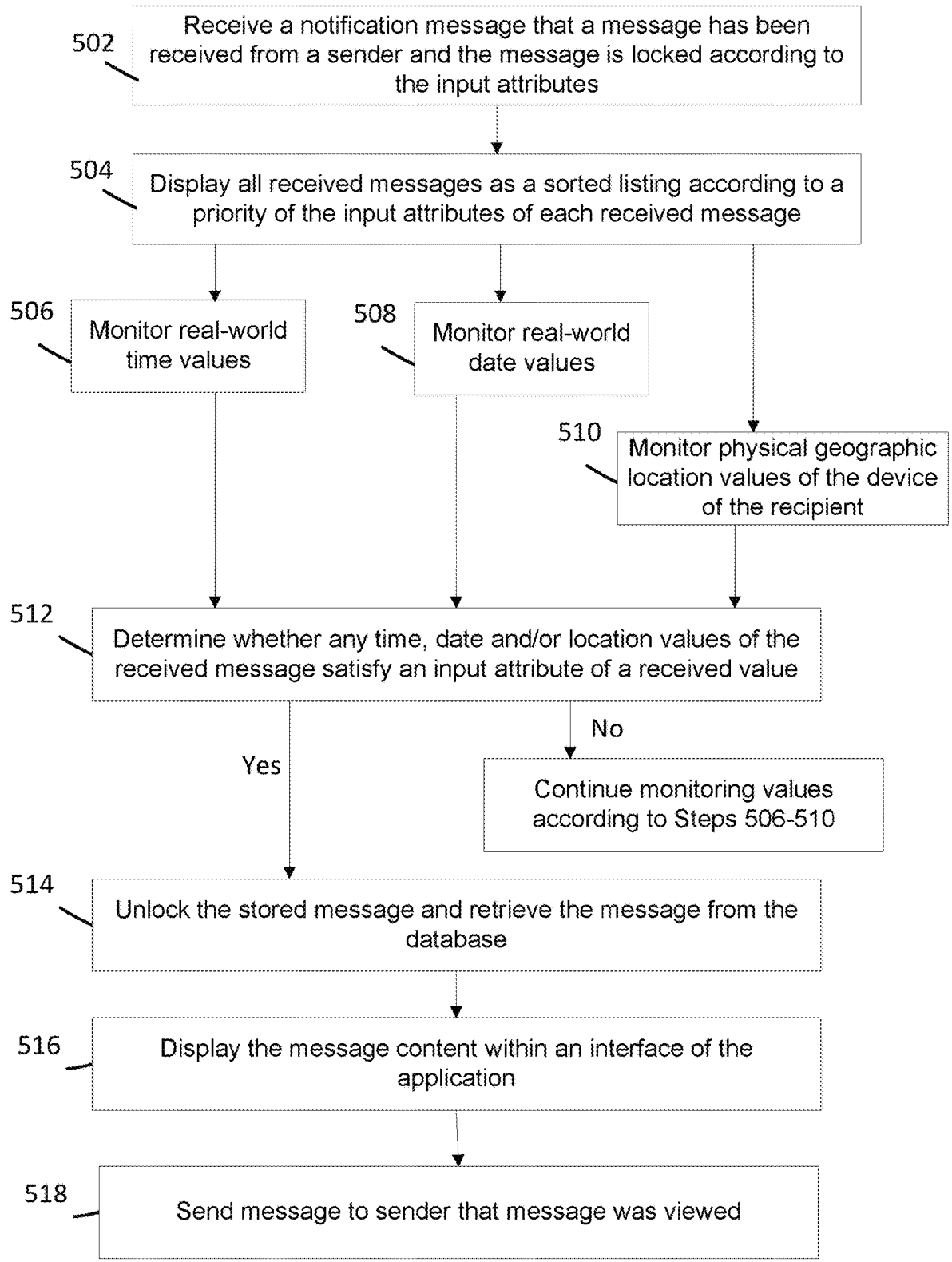

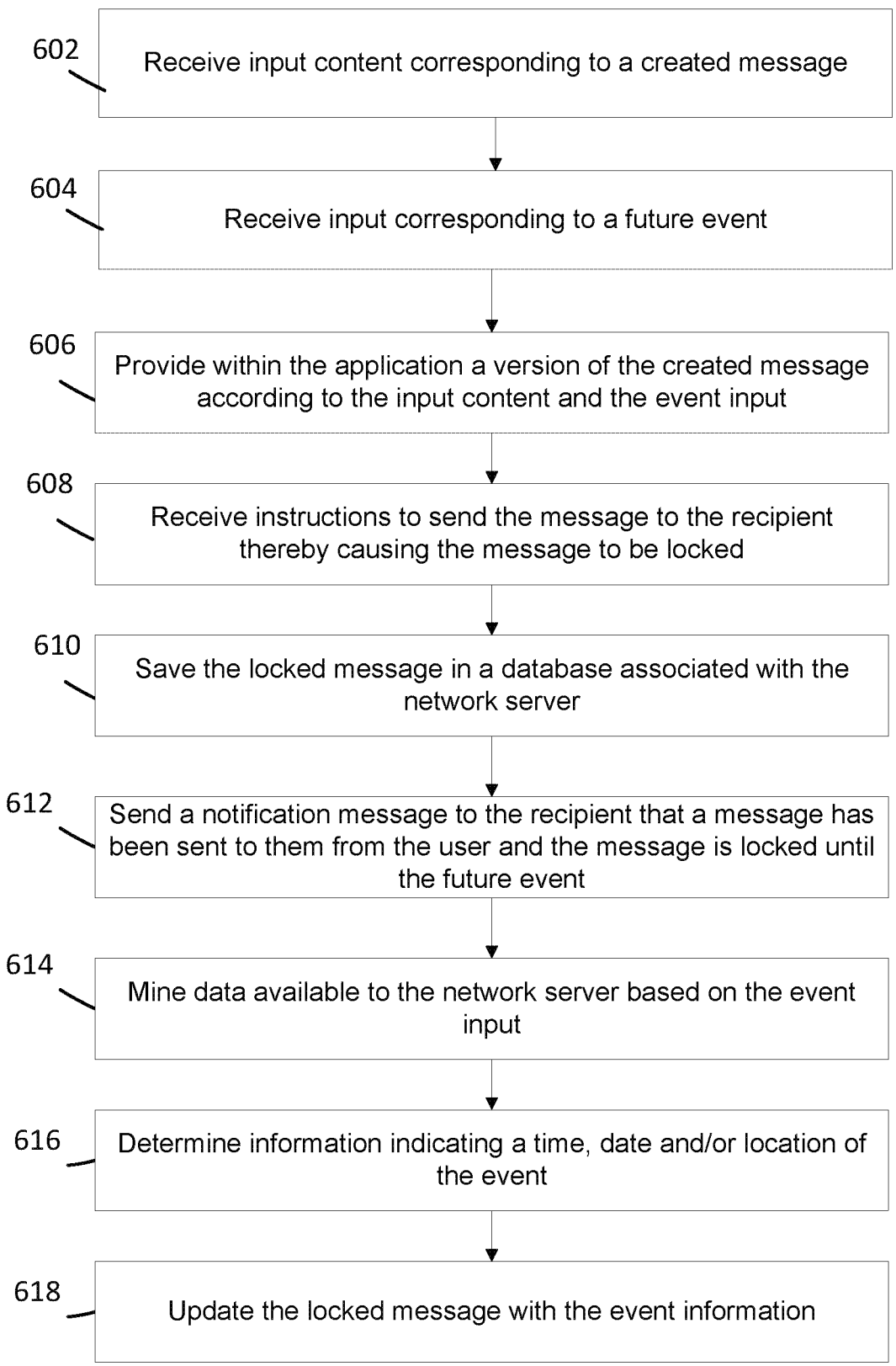

COMPUTERIZED SYSTEM AND METHOD FOR AUTOMATICALLY COMMUNICATING CONDITIONAL MESSAGES WITHIN A MOBILE APPLICATION ENVIRONMENT

This patent application claims the benefit of and is a continuation of U.S. patent application Ser. No. 15/385,129, filed on Dec. 20, 2016, titled "Computerized System And Method For Automatically Communicating Conditional Messages Within A Mobile Application Environment", which is incorporated by reference herein in its entirety.

This application includes material that is subject to copyright protection. The copyright owner has no objection to the facsimile reproduction by anyone of the patent disclosure, as it appears in the Patent and Trademark Office files or records, but otherwise reserves all copyright rights whatsoever.

FIELD

The present disclosure relates generally to improving the performance of content messaging, searching, generating, providing and/or hosting computer devices, systems and/or platforms by modifying the capabilities and providing non-native functionality to such devices, systems and/or platforms for a novel and improved framework for creating and communicating locked electronic messages to desired recipients only upon the satisfaction of real-world conditions set by the sending user.

SUMMARY

According to embodiments of the instant disclosure, novel computerized systems and methods are disclosed for an improved mobile messaging platform or application, or combination thereof, that enables a sending user to create and send locked electronic messages to one or more recipients, such that the message is automatically unlocked for delivery and viewing by the recipient(s) only upon satisfaction of a real-world condition set by the sending user.

According to some embodiments, an electronic message, which can be embodied as, or include digital content files of, but not limited to, text, images, video, audio, map information/data, short form videos (e.g., graphics interchange files (GIFs)), or any other type of known or to be known media or multi-media, or some combination thereof. As discussed herein, the real-world conditions (or restrictions, variables, or attributes, used interchangeably), can be associated with a real-world time value, date value and/or physical geographic location. These conditions are electronically applied to the message prior to sending by the mobile messaging platform, and serve as locking features for the message such that only upon the condition(s) being satisfied is the message unlocked and delivered to a recipient's device. Thus, among other novel features as discussed herein, the created message provides the sending user's device executing the mobile messaging platform (e.g., application) with novel functional control of how, when and where a recipient user's device (also executing the mobile messaging platform/application) receives and renders messages.

Accordingly, in one or more embodiments, a method is disclosed for a novel and improved mobile messaging platform that automatically stores and sends messages to recipients in accordance with real-world conditions applied to the messages. Such conditional delivery provides a novel, computerized mechanism for providing recipients with delayed gratification, in that only upon the sending user's intentions being achieved, through application and satisfaction of the real-world conditions, does the recipient user have the ability to render, view or experience the content the sending user has provided them. The disclosed systems and methods therefore, among other novel features, blur the lines between the real-world and digital world by enabling digital content to be viewable only upon a particular set of real-world variables being satisfied; thus, as a user interacts with the physical world, the digital world can parallel his/her activities and supplement his/her experiences with digital content provided by other users (or entities). Among other benefits, the disclosed systems and methods therefore provide a more robust social experience spanning the digital and physical worlds, thereby causing users, via their interactions both online and in the physical world, to experience a less isolating and more inclusive social and messaging experience.

In accordance with one or more embodiments, a non-transitory computer-readable storage medium is provided, the non-transitory computer-readable storage medium tangibly storing thereon, or having tangibly encoded thereon, computer readable instructions that when executed cause at least one processor to perform a method for a novel and improved framework for creating and communicating locked electronic messages to desired recipients only upon the satisfaction of real-world condition set by the sending user.

In accordance with one or more embodiments, a system is provided that comprises one or more computing devices configured to provide functionality in accordance with such embodiments. In accordance with one or more embodiments, functionality is embodied in steps of a method performed by at least one computing device. In accordance with one or more embodiments, program code (or program logic) executed by a processor(s) of a computing device to implement functionality in accordance with one or more such embodiments is embodied in, by and/or on a non-transitory computer-readable medium.

BRIEF DESCRIPTION OF THE DRAWINGS

The foregoing and other objects, features, and advantages of the disclosure will be apparent from the following description of embodiments as illustrated in the accompanying drawings, in which reference characters refer to the same parts throughout the various views. The drawings are not necessarily to scale, emphasis instead being placed upon illustrating principles of the disclosure:

FIG. 3 is a schematic block diagram illustrating components of an exemplary system in accordance with some embodiments of the present disclosure;

FIG. 4 is a flowchart illustrating steps performed in accordance with some embodiments of the present disclosure;

FIG. 5 is a flowchart illustrating steps performed in accordance with some embodiments of the present disclosure;

FIG. 6 is a flowchart illustrating steps performed in accordance with some embodiments of the present disclosure;

DESCRIPTION OF EMBODIMENTS

Figure 1:
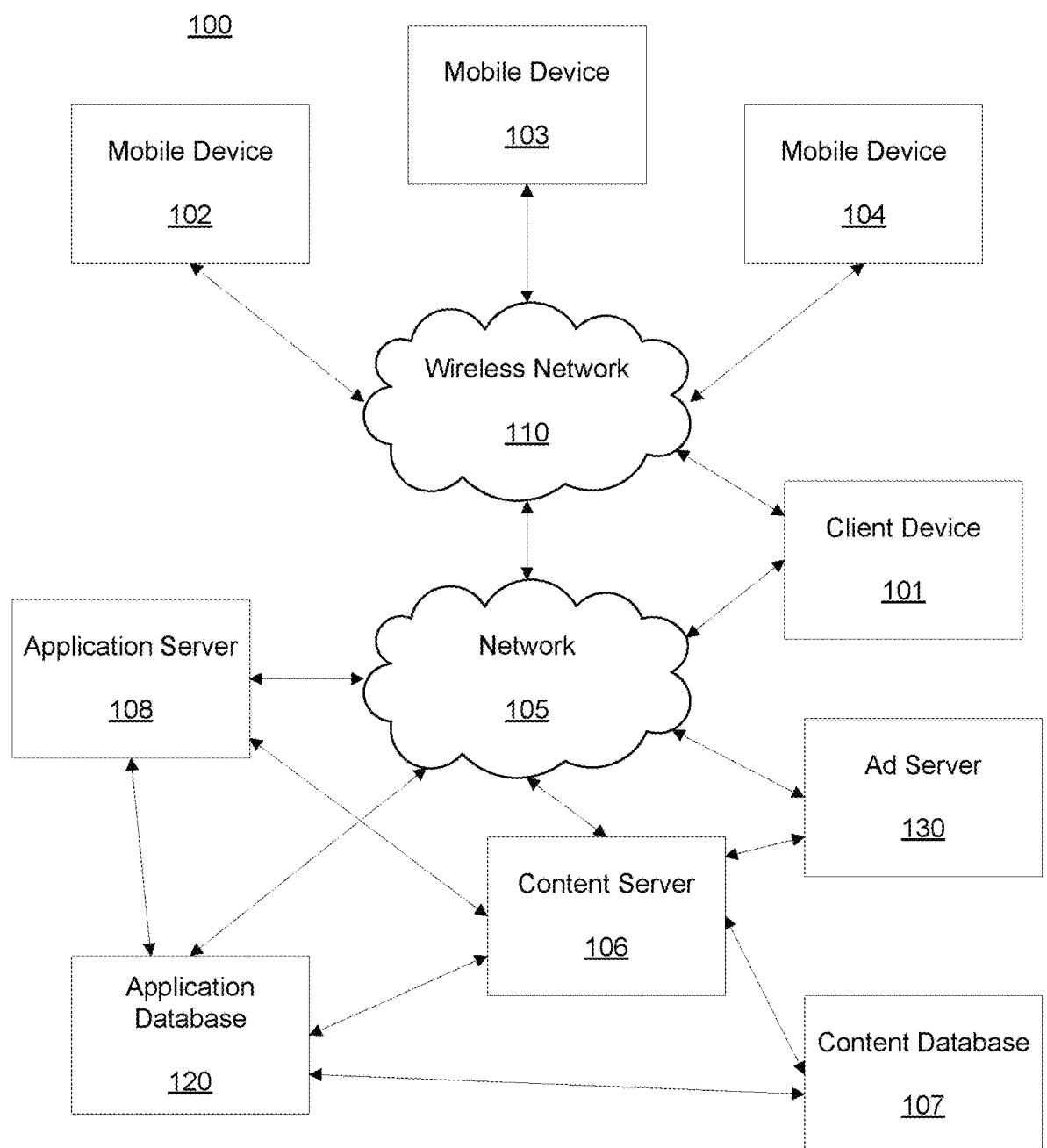
FIG. 1 is a schematic diagram illustrating an example of a network within which the systems and methods disclosed herein could be implemented according to some embodiments of the present disclosure.

The present disclosure will now be described more fully hereinafter with reference to the accompanying drawings, which form a part hereof, and which show, by way of illustration, certain example embodiments. Subject matter may, however, be embodied in a variety of different forms and, therefore, covered or claimed subject matter is intended to be construed as not being limited to any example embodiments set forth herein; example embodiments are provided merely to be illustrative. Likewise, a reasonably broad scope for claimed or covered subject matter is intended. Among other things, for example, subject matter may be embodied as methods, devices, components, or systems. Accordingly, embodiments may, for example, take the form of hardware, software, firmware or any combination thereof (other than software per se). The following detailed description is, therefore, not intended to be taken in a limiting sense.

Throughout the specification and claims, terms may have nuanced meanings suggested or implied in context beyond an explicitly stated meaning. Likewise, the phrase "in one embodiment" as used herein does not necessarily refer to the same embodiment and the phrase "in another embodiment" as used herein does not necessarily refer to a different embodiment. It is intended, for example, that claimed subject matter include combinations of example embodiments in whole or in part.

In general, terminology may be understood at least in part from usage in context. For example, terms, such as "and", "or", or "and/or," as used herein may include a variety of meanings that may depend at least in part upon the context in which such terms are used. Typically, "or" if used to associate a list, such as A, B or C, is intended to mean A, B, and C, here used in the inclusive sense, as well as A, B or C, here used in the exclusive sense. In addition, the term "one or more" as used herein, depending at least in part upon context, may be used to describe any feature, structure, or characteristic in a singular sense or may be used to describe combinations of features, structures or characteristics in a plural sense. Similarly, terms, such as "a," "an," or "the," again, may be understood to convey a singular usage or to convey a plural usage, depending at least in part upon context. In addition, the term "based on" may be understood as not necessarily intended to convey an exclusive set of factors and may, instead, allow for existence of additional factors not necessarily expressly described, again, depending at least in part on context.

The present disclosure is described below with reference to block diagrams and operational illustrations of methods and devices. It is understood that each block of the block diagrams or operational illustrations, and combinations of blocks in the block diagrams or operational illustrations, can be implemented by means of analog or digital hardware and computer program instructions. These computer program instructions can be provided to a processor of a general purpose computer to alter its function as detailed herein, a special purpose computer, ASIC, or other programmable data processing apparatus, such that the instructions, which execute via the processor of the computer or other programmable data processing apparatus, implement the functions/acts specified in the block diagrams or operational block or blocks. In some alternate implementations, the functions/acts noted in the blocks can occur out of the order noted in the operational illustrations. For example, two blocks shown in succession can in fact be executed substantially concurrently or the blocks can sometimes be executed in the reverse order, depending upon the functionality/acts involved.

These computer program instructions can be provided to a processor of: a general purpose computer to alter its function to a special purpose; a special purpose computer; ASIC; or other programmable digital data processing apparatus, such that the instructions, which execute via the processor of the computer or other programmable data processing apparatus, implement the functions/acts specified in the block diagrams or operational block or blocks, thereby transforming their functionality in accordance with embodiments herein.

For the purposes of this disclosure a computer readable medium (or computer-readable storage medium/media) stores computer data, which data can include computer program code (or computer-executable instructions) that is executable by a computer, in machine readable form. By way of example, and not limitation, a computer readable medium may comprise computer readable storage media, for tangible or fixed storage of data, or communication media for transient interpretation of code-containing signals. Computer readable storage media, as used herein, refers to physical or tangible storage (as opposed to signals) and includes without limitation volatile and non-volatile, removable and non-removable media implemented in any method or technology for the tangible storage of information such as computer-readable instructions, data structures, program modules or other data. Computer readable storage media includes, but is not limited to, RAM, ROM, EPROM, EEPROM, flash memory or other solid state memory technology, CD-ROM, DVD, or other optical storage, magnetic cassettes, magnetic tape, magnetic disk storage or other magnetic storage devices, or any other physical or material medium which can be used to tangibly store the desired information or data or instructions and which can be accessed by a computer or processor.

For the purposes of this disclosure the term "server" should be understood to refer to a service point which provides processing, database, and communication facilities. By way of example, and not limitation, the term "server" can refer to a single, physical processor with associated communications and data storage and database facilities, or it can refer to a networked or clustered complex of processors and associated network and storage devices, as well as operating software and one or more database systems and application software that support the services provided by the server. Servers may vary widely in configuration or capabilities, but generally a server may include one or more central processing units and memory. A server may also include one or more mass storage devices, one or more power supplies, one or more wired or wireless network interfaces, one or more input/output interfaces, or one or more operating systems, such as Windows Server, Mac OS X, Unix, Linux, FreeBSD, or the like.

For the purposes of this disclosure a "network" should be understood to refer to a network that may couple devices so that communications may be exchanged, such as between a server and a client device or other types of devices, including between wireless devices coupled via a wireless network, for example. A network may also include mass storage, such as network attached storage (NAS), a storage area network (SAN), or other forms of computer or machine readable media, for example. A network may include the Internet, one or more local area networks (LANs), one or more wide area networks (WANs), wire-line type connections, wireless type connections, cellular or any combination thereof. Likewise, sub-networks, which may employ differing architectures or may be compliant or compatible with differing protocols, may interoperate within a larger network. Various types of devices may, for example, be made available to provide an interoperable capability for differing architectures or protocols. As one illustrative example, a router may provide a link between otherwise separate and independent LANs.

A communication link or channel may include, for example, analog telephone lines, such as a twisted wire pair, a coaxial cable, full or fractional digital lines including T1, T2, T3, or T4 type lines, Integrated Services Digital Networks (ISDNs), Digital Subscriber Lines (DSLs), wireless links including satellite links, or other communication links or channels, such as may be known to those skilled in the art. Furthermore, a computing device or other related electronic devices may be remotely coupled to a network, such as via a wired or wireless line or link, for example.

For purposes of this disclosure, a "wireless network" should be understood to couple client devices with a network. A wireless network may employ stand-alone ad-hoc networks, mesh networks, Wireless LAN (WLAN) networks, cellular networks, or the like. A wireless network may further include a system of terminals, gateways, routers, or the like coupled by wireless radio links, or the like, which may move freely, randomly or organize themselves arbitrarily, such that network topology may change, at times even rapidly.

A wireless network may further employ a plurality of network access technologies, including Wi-Fi, Long Term Evolution (LTE), WLAN, Wireless Router (WR) mesh, or 2nd, 3rd, or 4th generation (2G, 3G, 4G or 5G) cellular technology, or the like. Network access technologies may enable wide area coverage for devices, such as client devices with varying degrees of mobility, for example.

For example, a network may enable RF or wireless type communication via one or more network access technologies, such as Global System for Mobile communication (GSM), Universal Mobile Telecommunications System (UMTS), General Packet Radio Services (GPRS), Enhanced Data GSM Environment (EDGE), 3GPP Long Term Evolution (LTE), LTE Advanced, Wideband Code Division Multiple Access (WCDMA), Bluetooth, 802.11b/g/n, or the like. A wireless network may include virtually any type of wireless communication mechanism by which signals may be communicated between devices, such as a client device or a computing device, between or within a network, or the like.

A computing device may be capable of sending or receiving signals, such as via a wired or wireless network, or may be capable of processing or storing signals, such as in memory as physical memory states, and may, therefore, operate as a server. Thus, devices capable of operating as a server may include, as examples, dedicated rack-mounted servers, desktop computers, laptop computers, set top boxes, integrated devices combining various features, such as two or more features of the foregoing devices, or the like. Servers may vary widely in configuration or capabilities, but generally a server may include one or more central processing units and memory. A server may also include one or more mass storage devices, one or more power supplies, one or more wired or wireless network interfaces, one or more input/output interfaces, or one or more operating systems, such as, for example, Windows Server, Mac OS X, Unix, Linux, FreeBSD, or the like.

For purposes of this disclosure, a client (or consumer or user) device may include a computing device capable of sending or receiving signals, such as via a wired or a wireless network. A client device may, for example, include a desktop computer or a portable device, such as a cellular telephone, a smart phone, a display pager, a radio frequency (RF) device, an infrared (IR) device an Near Field Communication (NFC) device, a Personal Digital Assistant (PDA), a handheld computer, a tablet computer, a phablet, a laptop computer, a set top box, a wearable computer, smart watch, an integrated or distributed device combining various features, such as features of the forgoing devices, or the like.

A client device may vary in terms of capabilities or features. Claimed subject matter is intended to cover a wide range of potential variations. For example, a simple smart phone, phablet or tablet may include a numeric keypad or a display of limited functionality, such as a monochrome liquid crystal display (LCD) for displaying text. In contrast, however, as another example, a web-enabled client device may include a high-resolution screen, one or more physical or virtual keyboards, mass storage, one or more accelerometers, one or more gyroscopes, global positioning system (GPS) or other location-identifying type capability, or a display with a high degree of functionality, such as a touch-sensitive color 2D or 3D display, for example.

A client device may include or may execute a variety of operating systems, including a personal computer operating system, such as a Windows, iOS or Linux, or a mobile operating system, such as iOS, Android, or Windows Mobile, or the like.

A client device may include or may execute a variety of possible applications, such as a client software application enabling communication with other devices, such as communicating one or more messages, such as via email, for example Yahoo! ® Mail, short message service (SMS), or multimedia message service (MMS), for example Yahoo! Messenger®, including via a network, such as a social network, including, for example, Tumblr®, Facebook®, LinkedIn®, Twitter®, Flickr®, or Google+®, Instagram™, to provide only a few possible examples. A client device may also include or execute an application to communicate content, such as, for example, textual content, multimedia content, or the like. A client device may also include or execute an application to perform a variety of possible tasks, such as browsing, searching, playing, streaming or displaying various forms of content, including locally stored or uploaded images and/or video, or games (such as fantasy sports leagues). The foregoing is provided to illustrate that claimed subject matter is intended to include a wide range of possible features or capabilities.

As discussed herein, reference to an "advertisement" should be understood to include, but not be limited to, digital media content embodied as a media item that provides information provided by another user, service, third party, entity, and the like. Such digital ad content can include any type of known or to be known media renderable by a computing device, including, but not limited to, video, text, audio, images, and/or any other type of known or to be known multi-media item or object. In some embodiments, the digital ad content can be formatted as hyperlinked multi-media content that provides deep-linking features and/ or capabilities. Therefore, while some content is referred to as an advertisement, it is still a digital media item that is renderable by a computing device, and such digital media item comprises content relaying promotional content provided by a network associated party.

The principles described herein may be embodied in many different forms. By way of background, conventional messaging systems only provide functionality for messages to be sent and received. These systems are agnostic of any limitation, restriction or condition on how, when and/or where messages can or should be delivered. In other words, there is currently no known system, technology or mechanism that enables the delayed delivery of messages according to preset real-world conditions, such that the messages are locked and stored in a cloud database, and are only unlocked and delivered to a recipient upon the real-world conditions being satisfied.

The disclosed systems and methods provide novel messaging functionality through an improved messaging framework that controls how, when and/or where messages are delivered to devices of intended recipients. According to embodiments of the instant disclosure, the disclosed systems and methods effectuate control of recipient devices such that only upon a recipient's device being in accordance with a preset real-world condition applied to a message is the message actually delivered to the recipient's device. In some embodiments, the disclosed messaging framework provides a notification to the recipient user that a message is addressed to them, and that the message is subject to a set of real-world conditions. Such notification is controlled by the messaging framework discussed herein (see the Messaging engine 300 discussed in relation to FIGS. 3-7G below), which can be executed and implemented by the sender's device, recipient's device and/or networked server, or some combination thereof. Despite the notification message being sent to the recipient, only upon the specific values of the conditions being satisfied is the message retrieved from storage and delivered to the recipient's device.

As discussed herein, the real-world conditions applied to a message can be associated with a real-world time value, date value, and/or physical geographic location. Thus, as discussed in more detail below in relation to FIGS. 4-7G, satisfaction of the conditions applied to a sent message, which trigger the delivery of the message, can involve a time or date value occurring, a time value expiring, a time range beginning and ending, a future event occurring, and/or a recipient's device being at, with a predetermined proximity, or moving to a particular physical geographic location (as indicated by the longitude and latitude values of the device's location, geographical positioning system (GPS) data of the device, or any other type of geographical identifier or value associated with a device).

By way of a non-limiting example, user Bob and user Mary are married. Bob is at the spot where he proposed to Mary and he takes a picture of the location. Bob creates a message and sends it to Mary, where the message includes the captured picture, and a message that says "Happy Anniversary." Bob sets as a condition for delivery the date of their anniversary. Upon Bob, on his device, sending the message, the message is analyzed and stored in a database on a network (e.g., a Cloud server), where it is locked for delivery on their anniversary. When the date of their anniversary arrives, the message is unlocked and sent to Mary. As discussed above, Mary can receive a notification message (e.g., a push message) that indicates that Bob has sent her a message, and that the message will be delivered on that date; however, prior to such date arriving, Mary is unable to view, access or receive the message.

In another non-limiting example, using Bob and Mary again, Bob is at Starbucks® and knows that Mary loves coffee. For his anniversary again, Bob creates a message that includes an eGift card (e.g., a bar code or coupon code) for a purchase of a coffee at the Starbucks® closest to their house. Upon Bob sending the message to Mary, the message locks according to conditions associated with the location of the Starbucks®. In some embodiments, as discussed below, the locational condition of the message can be associated with a proximity to the Starbucks (e.g., geo-fencing the location) such that when Mary is determined to be within range of the Starbucks (e.g., within the threshold distance to the Starbucks), the message is unlocked and delivered. As in the example above, Mary receives a notification message that indicates she received a message from Bob, and such notification can indicate that the message is deliverable upon Mary visiting the Starbucks location.

In yet another non-limiting example, Bob's eGift message can also, or alternatively, lock according to a time condition. For example, even if Mary visits the Starbucks location, if the date is not her anniversary, then the message will not unlock. Such information can be included in the notification message. Thus, this example message from Bob to Mary locked in accordance with date and geographical location conditions.

In some embodiments, the eGift card provided to Mary can have a set amount and/or a refillable amount provided by Bob. In embodiments where there is a set amount (e.g., $100), Mary may be afforded only the option to use the eGift at $10 increments, and upon the tenth use, it is fully spent and expires. In some embodiments, if Bob leaves the eGift card for multiple users, then the eGift can expire in a similar manner when all of the recipients have used the card a collective total of 10 times.

In some embodiments, conditions can be applied so that differing parts of a message are deliverable at different times. For example, Bob's message to Mary includes the photo of their engagement site and the eGift card. This two part message, set according to two different delivery conditions, may enable her to receive the eGift card as soon as it is sent (granted she is at the location), but she can only receive photo portion of the message on their anniversary.

In another non-limiting example, celebrity chef Jack visits a restaurant in Chicago and loves the food there. He can create a message and set its conditional delivery to a set of users (e.g., those users he has as contacts on his phone or on social media, or any user that visits the restaurant) that upon their visiting the restaurant as well (e.g., being at the restaurant), they will receive his complimentary assessment of the food there and a recommendation of what to try based on the daily specials. In some embodiments, the message account of the restaurant can include Jack's message in a message of their own, such that any person that visits the restaurant (e.g., is determined to be at the location thereby satisfying this location condition) and order's Jack's recommended dish will receive a discount on their meal. This message can be conditionally delivered according to any conditional parameter set, as discussed above—for example, during a time period (e.g., restaurant week), or at a particular location (e.g., only certain locations of the restaurant if the restaurant is a chain restaurant).

In another non-limiting example, user Jane is in a photograph in front of a statute at the local museum where she has struck a funny pose. She wants her friends to do the same and share them with each other. Therefore, a message can be sent by Jane to her friends for delivery only upon her friends visiting the museum. Upon visiting the museum and receiving the message, the users can capture their own version of the pose Jane did in her photo, which is included in her original message to her friends, and share their photo, as well as Jane's photo (or her message as a whole) with their network of users according to similar or newly applied delivery conditions.

In some alternative embodiments, the conditions applied to a sent message can be based conditions associated with the sending user's device—for example, the sending user being at or moving to a particular geographic location. For example, Bob and Mary have a child, Jim. Jim is 20 years old and home from college on summer break. When Bob and Mary are at work they want to ensure that Jim mows the lawn. Therefore, Bob can send Jim a message that unlocks and is delivered to Jim, when Bob arrives at work, a message to Jim to mow the lawn. Thus, when Bob's device detects that he is at work, which is around the time Jim is waking up (since he is on vacation), the message is retrieved from storage and sent to Jim's device.

In another non-limiting example, a family embarks on a trip to Rome, Italy for spring break. On their second day of the trip, the family decides to take a tour of Vatican City. Upon arrival the kids decide to consult their mobile application hosting the Messaging engine 300 ("app", as discussed in detail below) to check if there are any native Messaging engine messages awaiting them within the city. When they open the app, a virtual world associated with Vatican City is revealed to them. This displayed and interactive virtual world can display the messages as geographically-fixed and/or time-fixed, depending on the type of conditions the senders applied to the messages, as discussed herein. For example, the messages are left throughout the city by friends who have made that journey before them, as they wanted to memorialize the trip by leaving messages behind that would unlock when friends in their network also visited the city.

In another non-limiting example embodiment, users are provided the novel capability of sending a legacy message. For example, users can set as a delivery condition an event (or "life event"), which can serve as the trigger for the message being sent to the recipient, as discussed in more detail below in relation to FIG. 6. For example, user Rich has recently become a grandfather, and he is 80 years old. He realizes that he may not be around when his grandson Luke graduates from college. Therefore, Rich can draft a message for Luke and have it set to be delivered upon criteria specifying Luke's college graduation. This message can be sent up to the server and stored accordingly, as discussed in more detail below. Upon information indicating Luke's college graduation date being identified from one or more data sources with access to information representing Luke's life events, this information can be sent to the server for updating of the message. As discussed in more detail below, such information can be derived, determined, extracted or otherwise identified from information of users' profiles, a timeline, calendar, user behaviors, messages, and the like, as discussed below in more detail. Thus, upon the day of Luke's college graduation, Luke will be sent the message that his deceased grandfather left for him many years back.

The computerized messaging framework used for creating and delivering messages is compatible with other types of content creation, consumption and hosting sites, applications, platforms and systems, such as, for example, email systems (e.g., Gmail®), social networking systems (e.g., Facebook®, Twitter®), messaging applications (e.g., Facebook® Messenger, WhatsApp®) and the like. Thus, as discussed in more detail below, a user's contacts and content hosted on such systems can be leveraged in order to enable the user to create a customizable, more real-world contextually relevant content viewing experience. In some embodiments, the message framework can enable users that receive delivered messages, or those sending messages that have been delivered, to share such messages on such systems, thereby enabling deeper connections between users across a variety of networked platforms.

According to some embodiments, electronic messages sent and delivered via the messaging framework discussed herein can be embodied as, and/or include digital content files of, but not limited to, text, images, video, audio, map information/data, short form videos (e.g., graphics interchange files (GIFs)), or any other type of known or to be known media or multi-media, or some combination thereof. In some embodiments, messages can also include messages from other users, or even messages from other platforms (e.g., included or hyperlink a Tweet® in a message for a user to view upon delivery).

Thus, as discussed herein, the disclosed systems and methods provide an improved messaging framework that enables the creation and communication of locked electronic messages to recipients, where the message is automatically unlocked for recipient viewing only upon satisfaction of a real-world condition set by the sending user. Upon creating the message, the sender sets time, date and/or geographical restrictions for viewing the message, such that only upon those set restrictions being satisfied is the message delivered to the recipient user's device.

As discussed in more detail below at least in relation to FIG. 8, according to some embodiments, information associated with, derived from, created, or otherwise identified from, during or as a result of a sent or delivered message, as discussed herein, can be used for monetization purposes and targeted advertising when providing, delivering or enabling such devices access to messages, media and/or applications provided over a network. Providing targeted advertising to users associated with such discovered content can lead to an increased click-through rate (CTR) of such ads and/or an increase in the advertiser's return on investment (ROI) for serving such content provided by third parties (e.g., digital advertisement content provided by an advertiser, where the advertiser can be a third party advertiser, or an entity directly associated with or hosting the systems and methods discussed herein).

Certain embodiments will now be described in greater detail with reference to the figures. In general, with reference to FIG. 1, a system 100 in accordance with an embodiment of the present disclosure is shown. FIG. 1 shows components of a general environment in which the systems and methods discussed herein may be practiced. Not all the components may be required to practice the disclosure, and variations in the arrangement and type of the components may be made without departing from the spirit or scope of the disclosure. As shown, system 100 of FIG. 1 includes local area networks ("LANs")/wide area networks ("WANs")—network 105, wireless network 110, mobile devices (client devices) 102-104 and client device 101. FIG. 1 additionally includes a variety of servers, such as content server 106, application (or "App") server 108, and advertising ("ad") server 130.

One embodiment of mobile devices 102-104 is described in more detail below. Generally, however, mobile devices 102-104 may include virtually any portable computing device capable of receiving and sending a message over a network, such as network 105, wireless network 110, or the like. Mobile devices 102-104 may also be described generally as client devices that are configured to be portable. Thus, mobile devices 102-104 may include virtually any portable computing device capable of connecting to another computing device and receiving information. Such devices include multi-touch and portable devices such as, cellular telephones, smart phones, display pagers, radio frequency (RF) devices, infrared (IR) devices, Personal Digital Assistants (PDAs), handheld computers, laptop computers, wearable computers, smart watch, tablet computers, phablets, integrated devices combining one or more of the preceding devices, and the like. As such, mobile devices 102-104 typically range widely in terms of capabilities and features. For example, a cell phone may have a numeric keypad and a few lines of monochrome LCD display on which only text may be displayed. In another example, a web-enabled mobile device may have a touch sensitive screen, a stylus, and an HD display in which both text and graphics may be displayed.

A web-enabled mobile device may include a browser application that is configured to receive and to send web pages, web-based messages, and the like. The browser application may be configured to receive and display graphics, text, multimedia, and the like, employing virtually any web based language, including a wireless application protocol messages (WAP), and the like. In one embodiment, the browser application is enabled to employ Handheld Device Markup Language (HDML), Wireless Markup Language (WML), WMLScript, JavaScript, Standard Generalized Markup Language (SMGL), HyperText Markup Language (HTML), eXtensible Markup Language (XML), and the like, to display and send a message.

Mobile devices 102-104 also may include at least one client application that is configured to receive content from another computing device. The client application may include a capability to provide and receive textual content, graphical content, audio content, and the like. The client application may further provide information that identifies itself, including a type, capability, name, and the like. In one embodiment, mobile devices 102-104 may uniquely identify themselves through any of a variety of mechanisms, including a phone number, Mobile Identification Number (MIN), an electronic serial number (ESN), or other mobile device identifier.

In some embodiments, mobile devices 102-104 may also communicate with non-mobile client devices, such as client device 101, or the like. In one embodiment, such communications may include sending and/or receiving messages, searching for, viewing and/or sharing photographs, audio clips, video clips, or any of a variety of other forms of communications. Client device 101 may include virtually any computing device capable of communicating over a network to send and receive information. The set of such devices may include devices that typically connect using a wired or wireless communications medium such as personal computers, multiprocessor systems, microprocessor-based or programmable consumer electronics, network PCs, or the like. Thus, client device 101 may also have differing capabilities for displaying navigable views of information.

Client devices 101-104 computing device may be capable of sending or receiving signals, such as via a wired or wireless network, or may be capable of processing or storing signals, such as in memory as physical memory states, and may, therefore, operate as a server. Thus, devices capable of operating as a server may include, as examples, dedicated rack-mounted servers, desktop computers, laptop computers, set top boxes, integrated devices combining various features, such as two or more features of the foregoing devices, or the like.

Wireless network 110 is configured to couple mobile devices 102-104 and its components with network 105. Wireless network 110 may include any of a variety of wireless sub-networks that may further overlay stand-alone ad-hoc networks, and the like, to provide an infrastructure-oriented connection for mobile devices 102-104. Such sub-networks may include mesh networks, Wireless LAN (WLAN) networks, cellular networks, and the like.

Network 105 is configured to couple content server 106, application server 108, or the like, with other computing devices, including, client device 101, and through wireless network 110 to mobile devices 102-104. Network 105 is enabled to employ any form of computer readable media for communicating information from one electronic device to another. Also, network 105 can include the Internet in addition to local area networks (LANs), wide area networks (WANs), direct connections, such as through a universal serial bus (USB) port, other forms of computer-readable media, or any combination thereof. On an interconnected set of LANs, including those based on differing architectures and protocols, a router acts as a link between LANs, enabling messages to be sent from one to another, and/or other computing devices.

Within the communications networks utilized or understood to be applicable to the present disclosure, such networks will employ various protocols that are used for communication over the network. Signal packets communicated via a network, such as a network of participating digital communication networks, may be compatible with or compliant with one or more protocols. Signaling formats or protocols employed may include, for example, TCP/IP, UDP, QUIC (Quick UDP Internet Connection), DECnet, NetBEUI, IPX, APPLETALK™, or the like. Versions of the Internet Protocol (IP) may include IPv4 or IPv6. The Internet refers to a decentralized global network of networks. The Internet includes local area networks (LANs), wide area networks (WANs), wireless networks, or long haul public networks that, for example, allow signal packets to be communicated between LANs. Signal packets may be communicated between nodes of a network, such as, for example, to one or more sites employing a local network address. A signal packet may, for example, be communicated over the Internet from a user site via an access node coupled to the Internet. Likewise, a signal packet may be forwarded via network nodes to a target site coupled to the network via a network access node, for example. A signal packet communicated via the Internet may, for example, be routed via a path of gateways, servers, etc. that may route the signal packet in accordance with a target address and availability of a network path to the target address.

According to some embodiments, the present disclosure may also be utilized within or accessible to an electronic social networking site. A social network refers generally to an electronic network of individuals, such as, but not limited to, acquaintances, friends, family, colleagues, or co-workers, that are coupled via a communications network or via a variety of sub-networks. Potentially, additional relationships may subsequently be formed as a result of social interaction via the communications network or sub-networks. In some embodiments, multi-modal communications may occur between members of the social network. Individuals within one or more social networks may interact or communication with other members of a social network via a variety of devices. Multi-modal communication technologies refers to a set of technologies that permit interoperable communication across multiple devices or platforms, such as cell phones, smart phones, tablet computing devices, phablets, personal computers, televisions, set-top boxes, SMS/MMS, email, instant messenger clients, forums, social networking sites, or the like.

In some embodiments, the disclosed networks 110 and/or 105 may comprise a content distribution network(s). A "content delivery network" or "content distribution network" (CDN) generally refers to a distributed content delivery system that comprises a collection of computers or computing devices linked by a network or networks. A CDN may employ software, systems, protocols or techniques to facilitate various services, such as storage, caching, communication of content, or streaming media or applications. A CDN may also enable an entity to operate or manage another's site infrastructure, in whole or in part.

The content server 106 may include a device that includes a configuration to provide content via a network to another device. A content server 106 may, for example, host a site, service or an associated application, such as, an email platform (e.g., Gmail®), a social networking site, a photo sharing site/service (e.g., Facebook®, Twitter®, Instagram®), a search platform or site, or a personal user site (such as a blog, vlog, online dating site, and the like) and the like. A content server 106 may also host a variety of other sites, including, but not limited to business sites, educational sites, dictionary sites, encyclopedia sites, wikis, financial sites, government sites, and the like. Devices that may operate as content server 106 include personal computers desktop computers, multiprocessor systems, microprocessor-based or programmable consumer electronics, network PCs, servers, and the like.

Content server 106 can further provide a variety of services that include, but are not limited to, streaming and/or downloading media services, search services, email services, photo services, web services, social networking services, news services, third-party services, audio services, video services, instant messaging (IM) services, SMS services, MMS services, FTP services, voice over IP (VOIP) services, or the like. Such services, for example a messaging application and/or messaging platform, can be provided via the application server 108, whereby a user is able to utilize such service upon the user being authenticated, verified or identified by the service. Examples of content may include videos, text, audio, images, or the like, which may be processed in the form of physical signals, such as electrical signals, for example, or may be stored in memory, as physical states, for example.

An ad server 130 comprises a server that stores online advertisements for presentation to users. "Ad serving" refers to methods used to place online advertisements on websites, in applications, or other places where users are more likely to see them, such as during an online session or during computing platform use, for example. Various monetization techniques or models may be used in connection with sponsored advertising, including advertising associated with user. Such sponsored advertising includes monetization techniques including sponsored search advertising, non-sponsored search advertising, guaranteed and non-guaranteed delivery advertising, ad networks/exchanges, ad targeting, ad serving and ad analytics. Such systems can incorporate near instantaneous auctions of ad placement opportunities during web page creation, (in some cases in less than 500 milliseconds) with higher quality ad placement opportunities resulting in higher revenues per ad. That is advertisers will pay higher advertising rates when they believe their ads are being placed in or along with highly relevant content that is being presented to users. Reductions in the time needed to quantify a high quality ad placement offers ad platforms competitive advantages. Thus higher speeds and more relevant context detection improve these technological fields.

For example, a process of buying or selling online advertisements may involve a number of different entities, including advertisers, publishers, agencies, networks, or developers. To simplify this process, organization systems called "ad exchanges" may associate advertisers or publishers, such as via a platform to facilitate buying or selling of online advertisement inventory from multiple ad networks. "Ad networks" refers to aggregation of ad space supply from publishers, such as for provision en masse to advertisers. For web portals like Yahoo! ®, advertisements may be displayed on web pages or in apps resulting from a user-defined search based at least in part upon one or more search terms. Advertising may be beneficial to users, advertisers or web portals if displayed advertisements are relevant to interests of one or more users. Thus, a variety of techniques have been developed to infer user interest, user intent or to subsequently target relevant advertising to users. One approach to presenting targeted advertisements includes employing demographic characteristics (e.g., age, income, gender, occupation, etc.) for predicting user behavior, such as by group. Advertisements may be presented to users in a targeted audience based at least in part upon predicted user behavior(s).

Another approach includes profile-type ad targeting. In this approach, user profiles specific to a user may be generated to model user behavior, for example, by tracking a user's path through a web site or network of sites, and compiling a profile based at least in part on pages or advertisements ultimately delivered. A correlation may be identified, such as for user purchases, for example. An identified correlation may be used to target potential purchasers by targeting content or advertisements to particular users. During presentation of advertisements, a presentation system may collect descriptive content about types of advertisements presented to users. A broad range of descriptive content may be gathered, including content specific to an advertising presentation system. Advertising analytics gathered may be transmitted to locations remote to an advertising presentation system for storage or for further evaluation. Where advertising analytics transmittal is not immediately available, gathered advertising analytics may be stored by an advertising presentation system until transmittal of those advertising analytics becomes available.

Servers 106, 108 and 130 may be capable of sending or receiving signals, such as via a wired or wireless network, or may be capable of processing or storing signals, such as in memory as physical memory states. Devices capable of operating as a server may include, as examples, dedicated rack-mounted servers, desktop computers, laptop computers, set top boxes, integrated devices combining various features, such as two or more features of the foregoing devices, or the like.

In some embodiments, users are able to access services provided by servers 106, 108 and/or 130. This may include in a non-limiting example, authentication servers, search servers, email servers, social networking services servers, SMS servers, IM servers, MMS servers, exchange servers, photo-sharing services servers, and travel services servers, via the network 105 using their various devices 101-104. In some embodiments, applications, such as a mail or messaging application (e.g., GMail®, WhatsApp®), a photo sharing/user-generated content (UGC) application (e.g., Flickr®, Tumblr®, and the like), a streaming video application (e.g., Netflix®, Hulu®, iTunes®, Amazon Prime®, HBO Go®, and the like), blog, photo or social networking application (e.g., Facebook®, Twitter® and the like), search application (e.g., Yahoo! ® Search), and the like, can be hosted by the application server 108 (or content server 106 and the like). Thus, the application server 108 can store various types of applications and application related information including application data, user profile information (e.g., identifying and content information associated with a user and/or device(s) of the user) in an associated application database 120, as discussed in more detail below. It should also be understood that content server 106 can also store various types of data related to the content and services provided by content server 106 in an associated content database 107, as discussed in more detail below. Embodiments exist where the network 105 is also coupled with/connected to a Trusted Search Server (TSS) which can be utilized to render content in accordance with the embodiments discussed herein. Embodiments exist where the TSS functionality can be embodied within servers 106, 108 and/or 130.

Moreover, although FIG. 1 illustrates servers 106, 108 and 130 as single computing devices, respectively, the disclosure is not so limited. For example, one or more functions of servers 106, 108 and/or 130 may be distributed across one or more distinct computing devices. Moreover, in one embodiment, servers 106, 108 and/or 130 may be integrated into a single computing device, without departing from the scope of the present disclosure.

Figure 2:
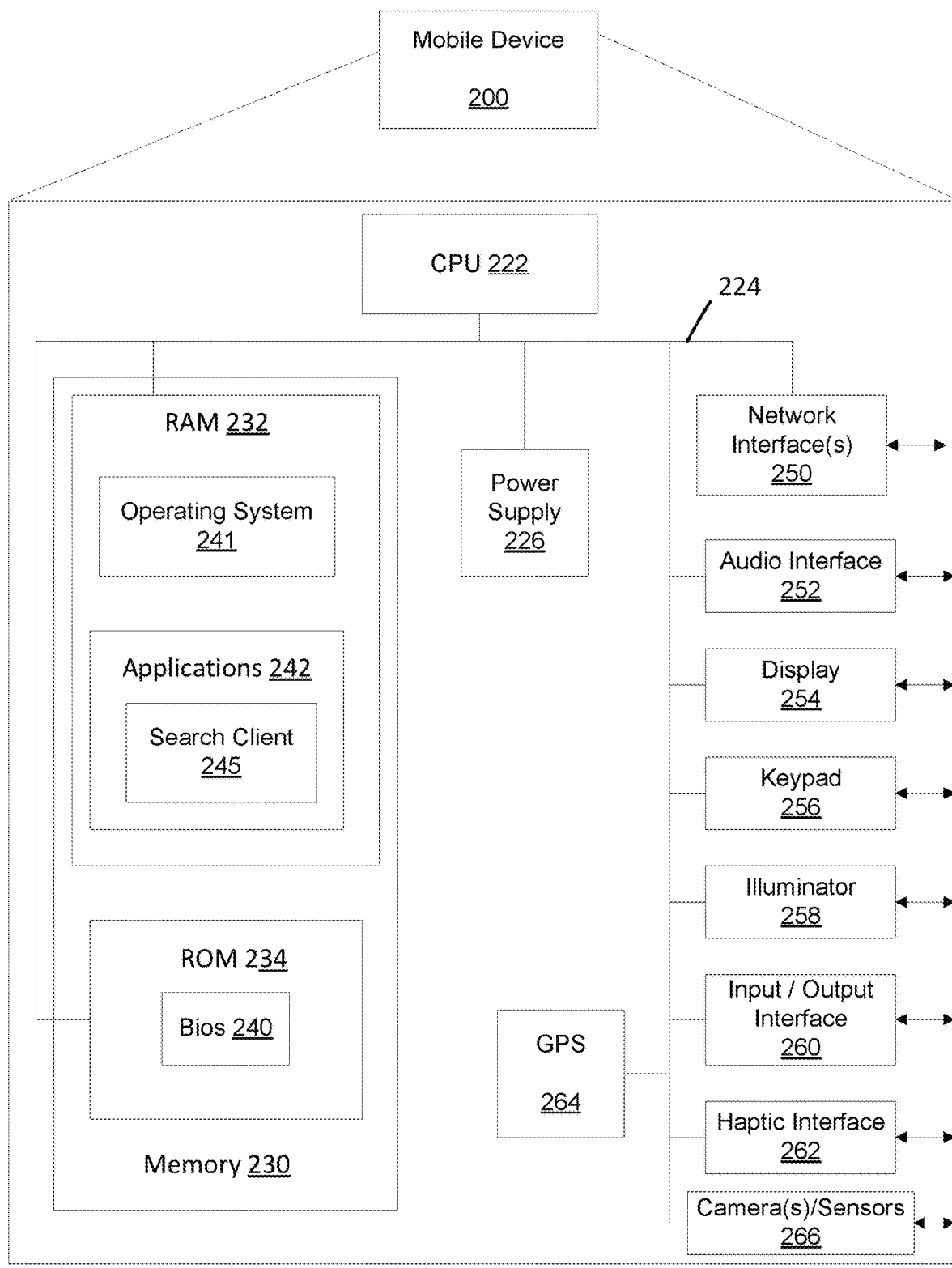
FIG. 2 depicts is a schematic diagram illustrating an example of client device in accordance with some embodiments of the present disclosure.

FIG. 2 is a schematic diagram illustrating a client device showing an example embodiment of a client device that may be used within the present disclosure. Client device 200 may include many more or less components than those shown in FIG. 2. However, the components shown are sufficient to disclose an illustrative embodiment for implementing the present disclosure. Client device 200 may represent, for example, client devices discussed above in relation to FIG. 1.

As shown in the figure, Client device 200 includes a processing unit (CPU) 222 in communication with a mass memory 230 via a bus 224. Client device 200 also includes a power supply 226, one or more network interfaces 250, an audio interface 252, a display 254, a keypad 256, an illuminator 258, an input/output interface 260, a haptic interface 262, an optional global positioning systems (GPS) receiver 264 and a camera(s) or other optical, thermal or electromagnetic sensors 266. Device 200 can include one camera/sensor 266, or a plurality of cameras/sensors 266, as understood by those of skill in the art. The positioning of the camera(s)/sensor(s) 266 on device 200 can change per device 200 model, per device 200 capabilities, and the like, or some combination thereof.

Power supply 226 provides power to Client device 200. A rechargeable or non-rechargeable battery may be used to provide power. The power may also be provided by an external power source, such as an AC adapter or a powered docking cradle that supplements and/or recharges a battery.

Client device 200 may optionally communicate with a base station (not shown), or directly with another computing device. Network interface 250 includes circuitry for coupling Client device 200 to one or more networks, and is constructed for use with one or more communication protocols and technologies as discussed above. Network interface 250 is sometimes known as a transceiver, transceiving device, or network interface card (NIC).

Audio interface 252 is arranged to produce and receive audio signals such as the sound of a human voice. For example, audio interface 252 may be coupled to a speaker and microphone (not shown) to enable telecommunication with others and/or generate an audio acknowledgement for some action. Display 254 may be a liquid crystal display (LCD), gas plasma, light emitting diode (LED), or any other type of display used with a computing device. Display 254 may also include a touch sensitive screen arranged to receive input from an object such as a stylus or a digit from a human hand.

Keypad 256 may comprise any input device arranged to receive input from a user. For example, keypad 256 may include a push button numeric dial, or a keyboard. Keypad 256 may also include command buttons that are associated with selecting and sending images. Illuminator 258 may provide a status indication and/or provide light. Illuminator 258 may remain active for specific periods of time or in response to events. For example, when illuminator 258 is active, it may backlight the buttons on keypad 256 and stay on while the client device is powered. Also, illuminator 258 may backlight these buttons in various patterns when particular actions are performed, such as dialing another client device. Illuminator 258 may also cause light sources positioned within a transparent or translucent case of the client device to illuminate in response to actions.

Client device 200 also comprises input/output interface 260 for communicating with external devices, such as a headset, or other input or output devices not shown in FIG. 2. Input/output interface 260 can utilize one or more communication technologies, such as USB, infrared, Bluetooth™, or the like. Haptic interface 262 is arranged to provide tactile feedback to a user of the client device. For example, the haptic interface may be employed to vibrate client device 200 in a particular way when the Client device 200 receives a communication from another user.

Optional GPS transceiver 264 can determine the physical coordinates of Client device 200 on the surface of the Earth, which typically outputs a location as latitude and longitude values. GPS transceiver 264 can also employ other geo-positioning mechanisms, including, but not limited to, triangulation, assisted GPS (AGPS), E-OTD, CI, SAI, ETA, BSS or the like, to further determine the physical location of Client device 200 on the surface of the Earth. It is understood that under different conditions, GPS transceiver 264 can determine a physical location within millimeters for Client device 200; and in other cases, the determined physical location may be less precise, such as within a meter or significantly greater distances. In one embodiment, however, Client device may through other components, provide other information that may be employed to determine a physical location of the device, including for example, a MAC address, Internet Protocol (IP) address, or the like.

Mass memory 230 includes a RAM 232, a ROM 234, and other storage means. Mass memory 230 illustrates another example of computer storage media for storage of information such as computer readable instructions, data structures, program modules or other data. Mass memory 230 stores a basic input/output system ("BIOS") 240 for controlling low-level operation of Client device 200. The mass memory also stores an operating system 241 for controlling the operation of Client device 200. It will be appreciated that this component may include a general purpose operating system such as a version of UNIX, or LINUX™, or a specialized client communication operating system such as Windows Client™, or the Symbian® operating system. The operating system may include, or interface with a Java virtual machine module that enables control of hardware components and/or operating system operations via Java application programs.

Memory 230 further includes one or more data stores, which can be utilized by Client device 200 to store, among other things, applications 242 and/or other data. For example, data stores may be employed to store information that describes various capabilities of Client device 200. The information may then be provided to another device based on any of a variety of events, including being sent as part of a header during a communication, sent upon request, or the like. At least a portion of the capability information may also be stored on a disk drive or other storage medium (not shown) within Client device 200.

Applications 242 may include computer executable instructions which, when executed by Client device 200, transmit, receive, and/or otherwise process audio, video, images, and enable telecommunication with a server and/or another user of another client device. Other examples of application programs or "apps" in some embodiments include browsers, calendars, contact managers, task managers, transcoders, photo management, database programs, word processing programs, security applications, spreadsheet programs, games, search programs, and so forth. Applications 242 may further include search client 245 that is configured to send, to receive, and/or to otherwise process a search query and/or search result using any known or to be known communication protocols. Although a single search client 245 is illustrated it should be clear that multiple search clients may be employed. For example, one search client may be configured to enter a search query message, where another search client manages search results, and yet another search client is configured to manage serving digital content (e.g., advertisements) or other forms of digital data associated with, but not limited to, IMs, emails, and other types of known messages, or the like.

Having described the components of the general architecture employed within the disclosed systems and methods, the components' general operation with respect to the disclosed systems and methods will now be described below with reference to FIGS. 3-7G.

FIG. 3 is a block diagram illustrating the components for performing the systems and methods discussed herein. FIG. 3 includes a Messaging engine 300, network 315 and database 320. The Messaging engine 300 can be a special purpose machine or processor and could be hosted by a messaging server, application server, content server, social networking server, web server, search server, content provider, email service provider, ad server, user's computing device, and the like, or any combination thereof.

According to some embodiments, Messaging engine 300 can be embodied as a stand-alone application that executes on a user device. In some embodiments, the Messaging engine 300 can function as an application installed on the user's device, and in some embodiments, such application can be a web-based application accessed by the user device over a network. In some embodiments, the Messaging engine 300 can be installed as an augmenting script, program or application to another messaging and/or media content hosting/serving application, such as, for example, Yahoo!® Mail, Yahoo! ® Messenger, Yahoo! ® Search, Flickr®, Tumblr®, Twitter®, Instagram®, SnapChat®, Facebook®, Skype®, and the like.

The database 320 can be any type of database or memory, and can be associated with a content server on a network (e.g., content server 106, ad server 130 or application server 108 from FIG. 1) or a user's device (e.g., device 101-104 or device 200 from FIGS. 1-2). Database 320 can comprise, for example, a dataset of content items, device data and associated metadata, and user data and associated user metadata. Such information can be stored in the database 320 independently and/or as a linked or associated dataset. It should be understood that the data (and metadata) in the database 320 can be associated with any type of content, user, device or network information and type, whether known or to be known, without departing from the scope of the present disclosure.

Database 320 comprises a dataset of data and metadata associated with content items. While reference is made throughout the instant disclosure to messages generally in the form of "electronic messages," one of skill in the art would understand that any type and/or form of electronic documents or transmissions can be communicated and/or accessed and processed by the Messaging engine 300 according to the systems and methods discussed herein. For example, messages and/or content items of such messages, as discussed in detail below, can include any type of known or to be known form of digital content, whether as a whole file or included within a file, including, messages, text, audio, video, short form videos, map information, time data, multi-media, and the like. Thus, the messages and the data and metadata of such messages processed according to the disclosed systems and methods, and stored in database 320, can be any type of known or to be known electronic message. Examples of such messages can include, but are not limited to, email messages, HTML forms SMS/MMS messages, Skype® messages, Twitter® messages and other social messages, comments to an article or website, online forum posts/entries, word processing documents, help desk messages, portable document format (PDF) documents and/or other types of documents. The messages can be provided to the Messaging engine 300 or accessed by a computer program or device that can access the messages. In some embodiments, the messages can be stored in a database 320.

Database 320 can also comprise a dataset of data and metadata associated with local and/or network information related to users, devices, services, applications, user-generated content, third party provided content, and the like. Such information can be stored and indexed in the database 320 independently and/or as a linked or associated dataset. As discussed above, it should be understood that the data (and metadata) in the database 320 can be any type of information and type, whether known or to be known, without departing from the scope of the present disclosure.

According to some embodiments, database 320 can store data for users, i.e., user data. According to some embodiments, the stored user data can include, but is not limited to, information associated with a user's profile, user interests, user behavioral information, user attributes, user preferences or settings, user demographic information, user location information, user biographic information, and the like, or some combination thereof.

According to some embodiments, the user data can also include, for purposes sending, receiving and/or displaying messages, rendering and/or displaying content, and/or downloading, streaming and/or accessing applications on or over the network, device information, including, but not limited to, device identifying information, device capability information, voice/data carrier information, Internet Protocol (IP) address, applications installed or capable of being installed or executed on such device, and/or any, or some combination thereof. It should be understood that the data (and metadata) in the database 320 can be any type of information related to a user, content, a device, an application, a service provider, a content provider, whether known or to be known, without departing from the scope of the present disclosure.

According to some embodiments, database 320 can comprise information associated with content providers, such as, but not limited to, content generating and hosting sites or providers that enable users to search for, send and/or receive, upload, download, share, edit or otherwise avail users to content (e.g., Yahoo!® Search, Yahoo!® Mobile applications, Yahoo!® Mail, Flickr®, Tumblr®, Twitter®, Instagram®, SnapChat®, Facebook®, and the like). In some embodiments, database 320 can comprise data and metadata associated with such content information from one and/or an assortment of media hosting sites. In some embodiments, such content provider information can include, but is not limited to, versions, types and/or capabilities of applications that are resident or accessed by a user device, and/or are capable of being downloaded, executed, accessed or run on user device for purposes of rendering content.

In some embodiments, the information stored in database 320 can be represented as an n-dimensional vector (or feature vector) for each stored data/metadata item, where the information associated with, for example, the stored data and/or metadata can correspond to a node(s) on the vector. As such, database 320 can store and index stored information in database 320 as linked set of data and metadata, where the data and metadata relationship can be stored as the n-dimensional vector discussed above. Such storage can be realized through any known or to be known vector or array storage, including but not limited to, a hash tree, queue, stack, VList, or any other type of known or to be known dynamic memory allocation technique or technology. While the discussion of some embodiments involves vector analysis of stored information, as discussed above, the information can be analyzed, stored and indexed according to any known or to be known computational analysis or storage technique or algorithm, such as, but not limited to, word2vec analysis, cluster analysis, data mining, Bayesian network analysis, Hidden Markov models, artificial neural network analysis, logical model and/or tree analysis, and the like.

In some embodiments, database 320 can be a single database housing information associated with one or more devices, users, services and/or content providers, and in some embodiments, database 320 can be configured as a linked set of data stores that provides such information, as each datastore in the set is associated with and/or unique to a specific user, device, service and/or content provider.

As discussed above, with reference to FIG. 1, the network 315 can be any type of network such as, but not limited to, a wireless network, a local area network (LAN), wide area network (WAN), the Internet, or a combination thereof. The network 315 facilitates connectivity of the Messaging engine 300, and the database of stored resources 320. Indeed, as illustrated in FIG. 3, the Messaging engine 300 and database 320 can be directly connected by any known or to be known method of connecting and/or enabling communication between such devices and resources.

The principal processor, server, or combination of devices that comprises hardware programmed in accordance with the special purpose functions herein is referred to for convenience as Messaging engine 300, and includes login module 302, message creation module 304, storage module 306, notification module 308, message retrieval module 310 and display module 312. It should be understood that the engine(s) and modules discussed herein are non-exhaustive, as additional or fewer engines and/or modules (or sub-modules) may be applicable to the embodiments of the systems and methods discussed. The operations, configurations and functionalities of each module, and their role within embodiments of the present disclosure will be discussed below.

Turning to FIG. 4, Process 400 details steps performed in accordance with some embodiments of the present disclosure for creating or drafting, and then sending a message to a recipient, which is stored for later delivery according to a delivery condition applied to the message. It should be understood that while the discussion in Process 400 will be in relation to sending a message to a single recipient, it should not be construed as limiting, as functionality for sending multiple messages to any number of recipients, whether sent individually or as a group message would be understood by those of skill in the art as being implementable from the discussion herein. Embodiments of the actual delivery of the created message to the recipient upon satisfaction of the condition(s) will be discussed below in relation to FIG. 5.

Steps 402-404 are performed by the login module 302 of the Messaging engine 300; Steps 406 and 416 are performed by the storage module 306; Steps 408-414 are performed by the message creation module 304; and Step 418 is performed by the notification module 308.

Process 400 begins with Step 402 where a user on a device that is executing the Messaging engine 300 is authenticated. As discussed above in relation to FIG. 3, the Messaging engine 300 can be embodied as a standalone application installed on a user's device, or a web-based application that is accessible over a network. In some embodiments, Step 402 involves a user opening on their device the application and entering login credentials (e.g., username and password, voice or facial recognition or any other type of known or to be known biometric or entered credential that verifies a user's identity with respect to his/her account on the messaging platform provided by the Messaging engine 300).

In some embodiments, Step 402 can involve a user visiting an online application store and downloading the application to his/her device. In some embodiments, Step 402 can involve a user visiting a location on the Internet and accessing a web-based version of the application on his/her device. Upon downloading (or accessing) the application, the user can create an account, which can include user information, as understood by those of skill in the art, not limited to a username, password, and/or any other type of user or device related information or preferences, as discussed above in relation to the data stored in database 320 discussed above.

As discussed below in relation to Step 406, creation of the account (e.g., user profile) involves creating a data object that includes the user information of the account, which is stored in database 320. In some embodiments, authentication of the user account, as in Step 402, involves verifying the user's credentials and accessing and/or retrieving the data object from the database 320.

In Step 404, after the user is authenticated in Step 402, the user information on the device can be synchronized with the application data. In some embodiments, such synchronization can include checking to determine whether there is updated information on the device that is not stored in database 320, and if so, updating the data object in database 320 for the user. For example, if the user has added new contact information to his/her phone, then Step 404 involves storing the new contact information for the new contact in the database 320 (as in Steps 404 and 406). In some embodiments, the user information can also include content stored on the phone. For example, if the user has captured new digital images or videos since last logging in (or in the instance of creating a new account), then this information can be persisted to the database 320. Thus, the information persisted to the database 320 from the user device in Step 404 can be related to, but is not limited to, text messages, contact information, images, videos, application types, device information (e.g., if using a different/new device to access the application), audio, and the like, or some combination thereof.

In some embodiments, Step 404 can occur automatically upon the user being authenticated (e.g., logging in to his/her account, as in Step 402). In some embodiments, Step 404 can occur automatically upon the user creating his/her account, as discussed above. In some embodiments, Step 404 can occur automatically according to a predetermined period of time such that the information housed on the device is automatically persisted to the database even when the user is not logged into his/her account (e.g., upload new information in the background).

In Step 406, which can occur automatically in connection with Step 404 and 402 as discussed above, the synchronized information is stored (or persisted) into the created data object of the database 320 (which one of skill in the art would understand to be the database associated with the application server hosting the application Messaging engine 300). Step 406 can involve, for example, as discussed above in relation to FIG. 3, storing the user information as a feature vector or as a look-up table (LUT) referenced by a device identifier or user identifier (e.g., where a user's contact information and/or associated content that can be used to create a message can be identifiable within the data object stored in database 320 based on a search using such identifiers). As discussed in detail below with relation to Steps 408-418, the information in the stored data object is leveraged in order to create a deliverable message to a recipient.

In Step 408, the user begins drafting a message to a recipient. In Step 408, the user provides input content corresponding to a created message; such input content can include information associated with the identity of a recipient(s), digital content files to be included in the message, text or audio to be included as a greeting of the message, a layout or format of the message, and the like.

Figure 7A:
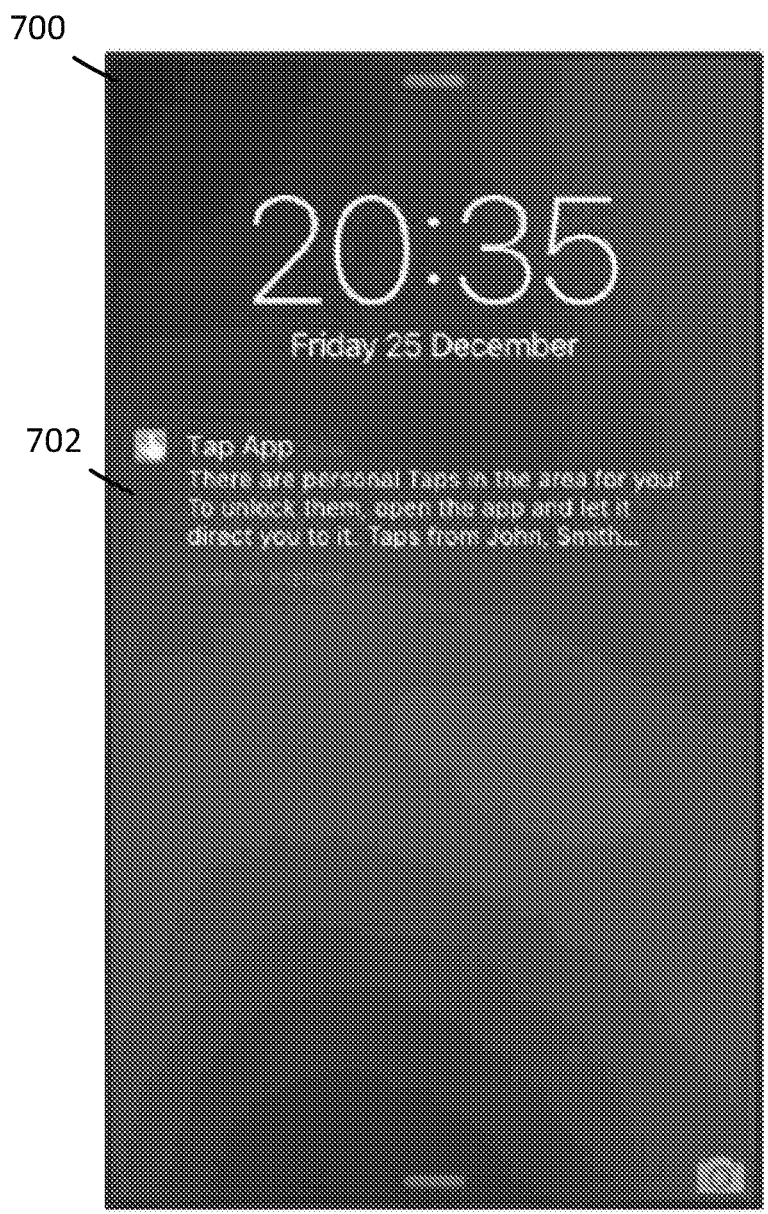
FIGS. 7A-7G illustrate non-limiting example embodiments according to some embodiments of the present disclosure.
Figure 7B:
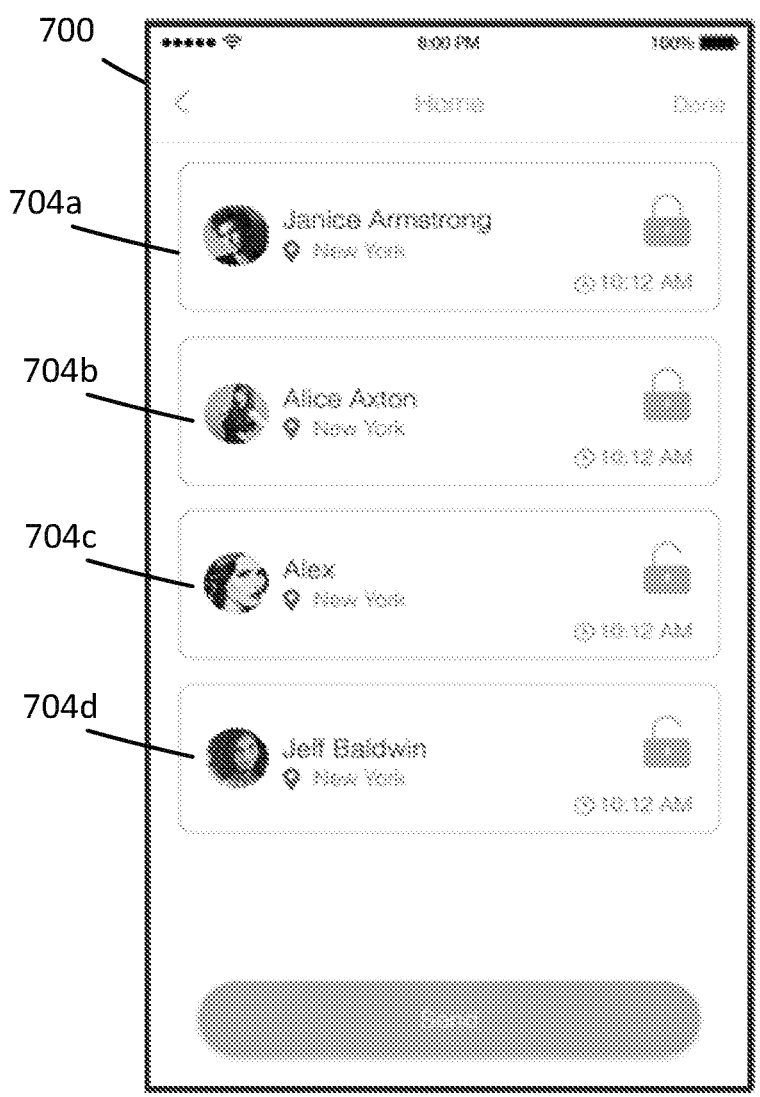
Figure 7C:
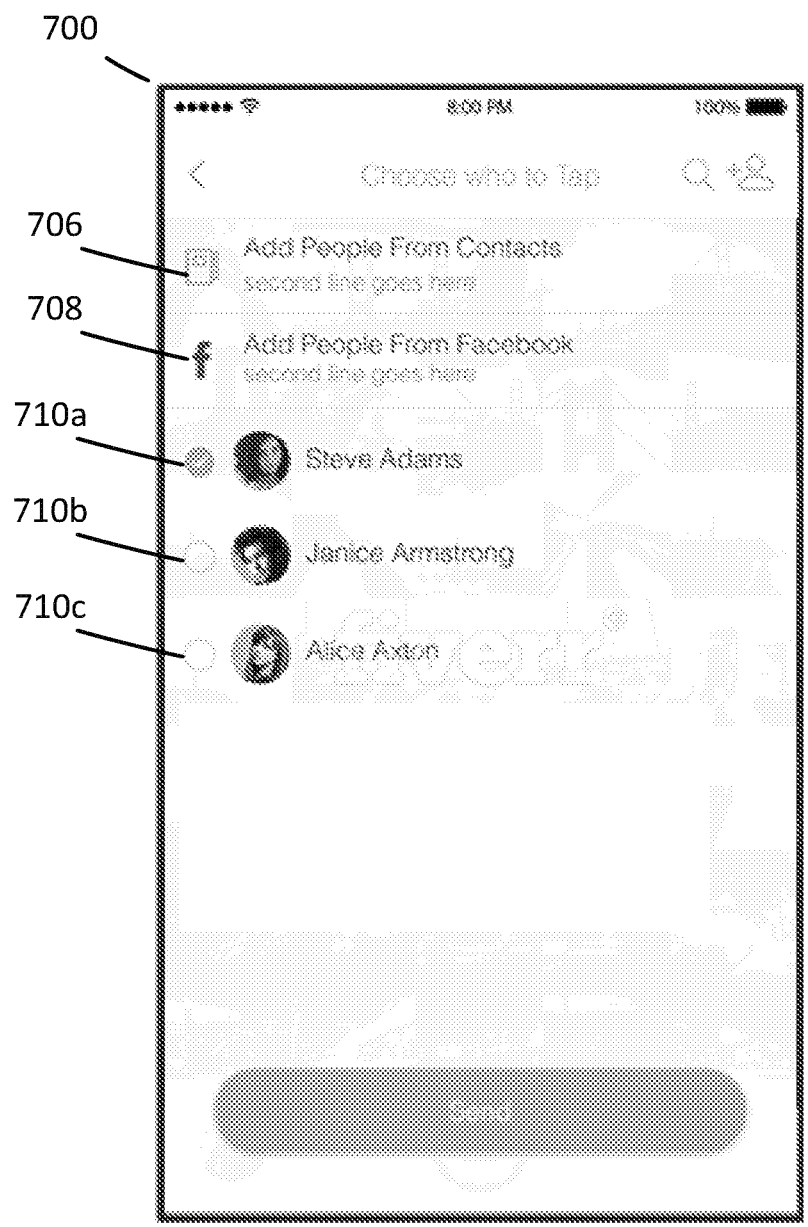

For example, as illustrated in FIG. 7C, mobile device user interface (UI) 700 includes the options for a user to select the identity of a recipient from his/her existing contacts 710*a*-710*c* (as illustrated in FIG. 7C, the user selects the user associated with item 710*a*, as indicated by the "check mark" next to the contact name). The UI 700 also enables the user to select and/or import and select contacts from his/her contacts (item 706, where such data can be retrieved from the user's device and/or from the data object stored in database 320, as discussed above). The UI also enables the user to select and/or import and select contacts (item 708) from an external application or third party provider—for example, Facebook®, as discussed above.

Figure 7D:
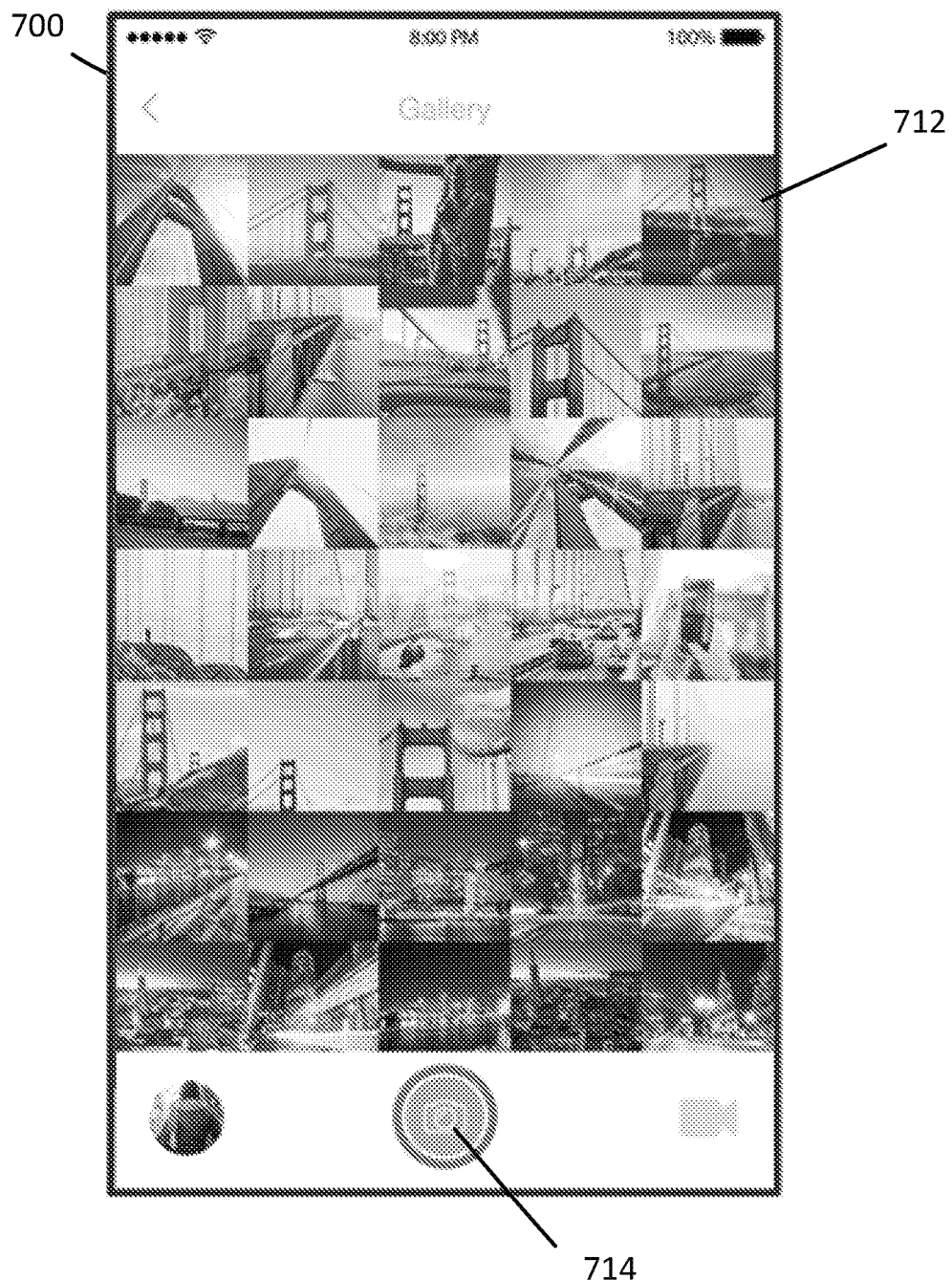

Additionally, for example, as mentioned above, the user is provided with the options to include content in the message. For example, as illustrated in FIG. 7D, the UI 700 provides an interface page that enables the user to select an image from a content library (item 712) (e.g., the content library stored on the user's device and persisted to database 320, as discussed above). Also illustrated in FIG. 7D, UI 700 enables the user to capture new media (e.g., image, video or audio) for inclusion in the created message, as illustrated by the media capture button 714. As discussed above, in some embodiments, once this media object is captured by button 714, which accesses the device's media capturing functionality (see item 266 of FIG. 2), the captured media can be persisted to database 320.

Thus, as a result of Step 408, a user has identified a recipient to send a drafted message, and the draft of the message includes at least some digital content, which can be content retrieved from a repository of content, and/or concurrently captured upon the creation of the message draft. In some embodiments, as discussed above, the user can also, at this point in message creation, enter a greeting that will accompany the message, which can be voice and/or text, and can be configured to be rendered along with, over, prior to, or after rendering of the content in the message (for example, using Bob's message to Mary discussed above—prior to displaying the picture of the proposal location, audio can be rendered that says "Happy Anniversary," which was recorded by Bob during the creation of the message).

In Step 410, attributes (or variables) associated with delivery conditions for the created message are input. As discussed above, the delivery conditions can be associated with time, date and/or geographical locational values (or attributes). Thus, in Step 410, the sending user selects, provides, or otherwise inputs the conditions that will dictate when or where the message is deliverable to the identified recipient.

Figure 7E:
Figure 7F:
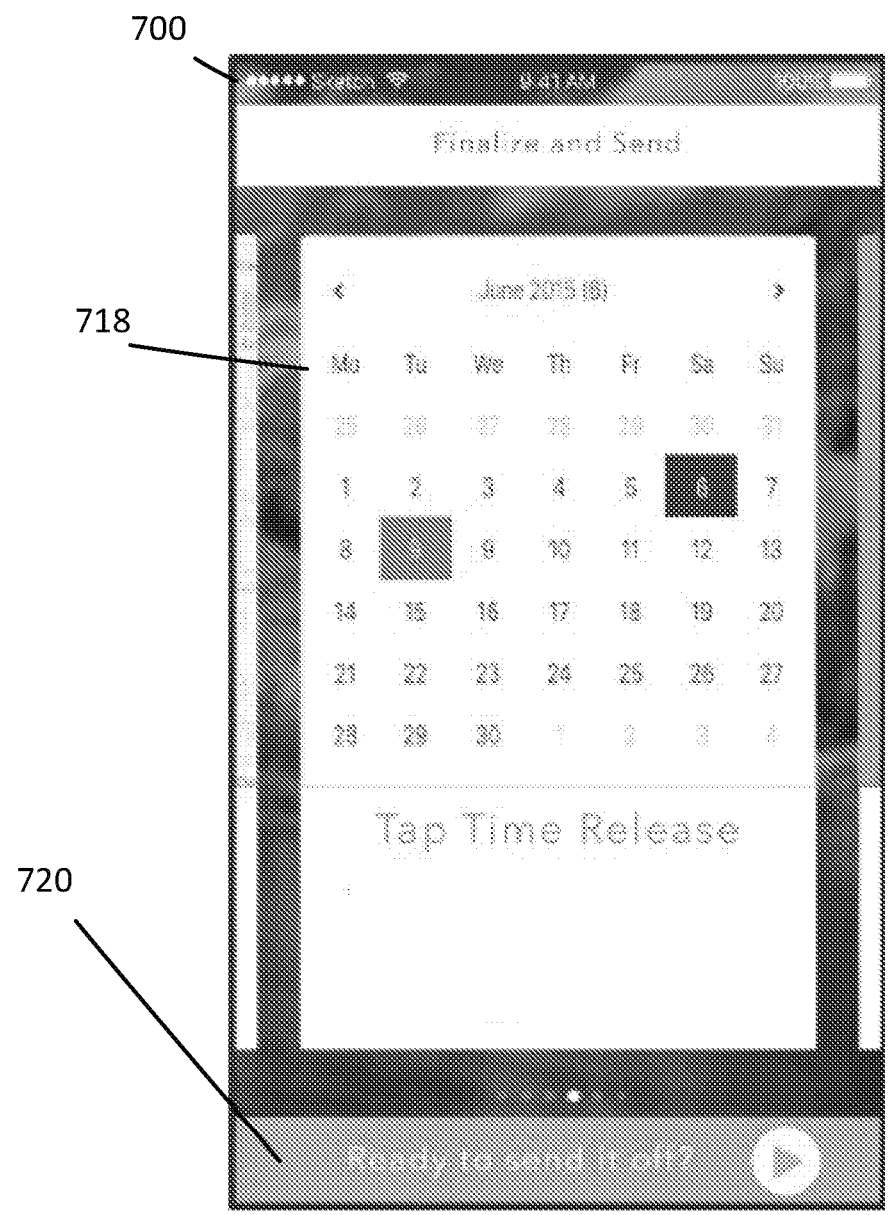

For example, as illustrated in FIG. 7F, the user can select a date from a displayed calendar 718 within UI 700. The calendar data can be retrieved and utilized by the Messaging engine 300 from calendar application data of the Messaging engine 300, or can be retrieved from a calendar application executing on the user's device. In the example in FIG. 7F, a date range is selected, therefore, the message will be accessible to the recipient from January $6^{th}$ to January $9^{th}$—e.g., delivered on January $6^{th}$ and will delete from the recipient user's inbox (and/or device or cloud storage) on January $9^{th}$. In some embodiments, upon selecting button 720, the user indicates that the conditions have been set and the process proceeds to Step 412.

According to some embodiments, when a user enters a geographical location as a delivery condition, the user can specify a specific location on a map by accessing a map application on his/her user device and selecting a particular location (e.g., by dropping a pin). In some embodiments, the user can search for a location or even a landmark and use an identifier for that location as the geographic condition. It should be understood that any known or to be known identifier for a location, which is understood by a mapping application in reference to a physical real-world address/location can be used herein without departing from the scope of the instant disclosure. For example, any GPS, latitude and longitude, street address, zip code, "dropped pin" or the like data can denote a particular location. In some embodiments, a selected location can be geo-fenced such that a proximity to a location can be applied, as discussed above. In some embodiments, the Messaging engine 300 can have geographic mapping data included in its application data, and identification of a location can be performed using the Messaging engine's mapping data in a similar manner as discussed above.

In Step 412, a draft version of the message is provided (e.g., displayed) to the user which provides information according to the inputs from Steps 408-410. The draft version of the message is a fully interactive and dynamically modifiable version of the message such that any modifications that are applied are automatically saved and displayed. The user can review the message content, message layout/format and/or the message conditions, and modify them via the UI 700. In some embodiments, the user is able to select each portion of the message and change them accordingly; and in some embodiments the user can drag message portions of the message to different positions in the message layout, thereby modifying how the message appears upon delivery.

For example, as illustrated in FIG. 7E, UI 700 displays an example drafted version of a message that the user can review, modify and/or confirm for sending. Item 716*a* is the "greeting" of the message that the user input upon entering the content during Step 408, as discussed above. Item 716*b* is the "content" of the message that the user input (e.g., selected from a content library or captured) during Step 408, as discussed above. Item 716*c* provides an identifier of the recipient the user identified in Step 408, as discussed above. And, Item 716*d* provides an indication of the delivery condition being applied to the user, as identified in Step 410 discussed above—which may or may not be viewable to the recipient upon the recipient receiving the message, but can be indicated in the notification message, as discussed in more detail below. For example, as in item 716*d*, the sending user selected that the message be delivered only when the recipient is at a specific location (which the user selected by accessing a mapping application or functionality within the Messaging engine 300 application and denoting the location via, for example, longitudinal and latitudinal values, as discussed above). The UI 700 in FIG. 7E also includes a "Send" button, which upon selection indicates the user's approval of the message and triggers the storage and sending of the message, as discussed in relation to Steps 414-418 below.

Figure 7G:
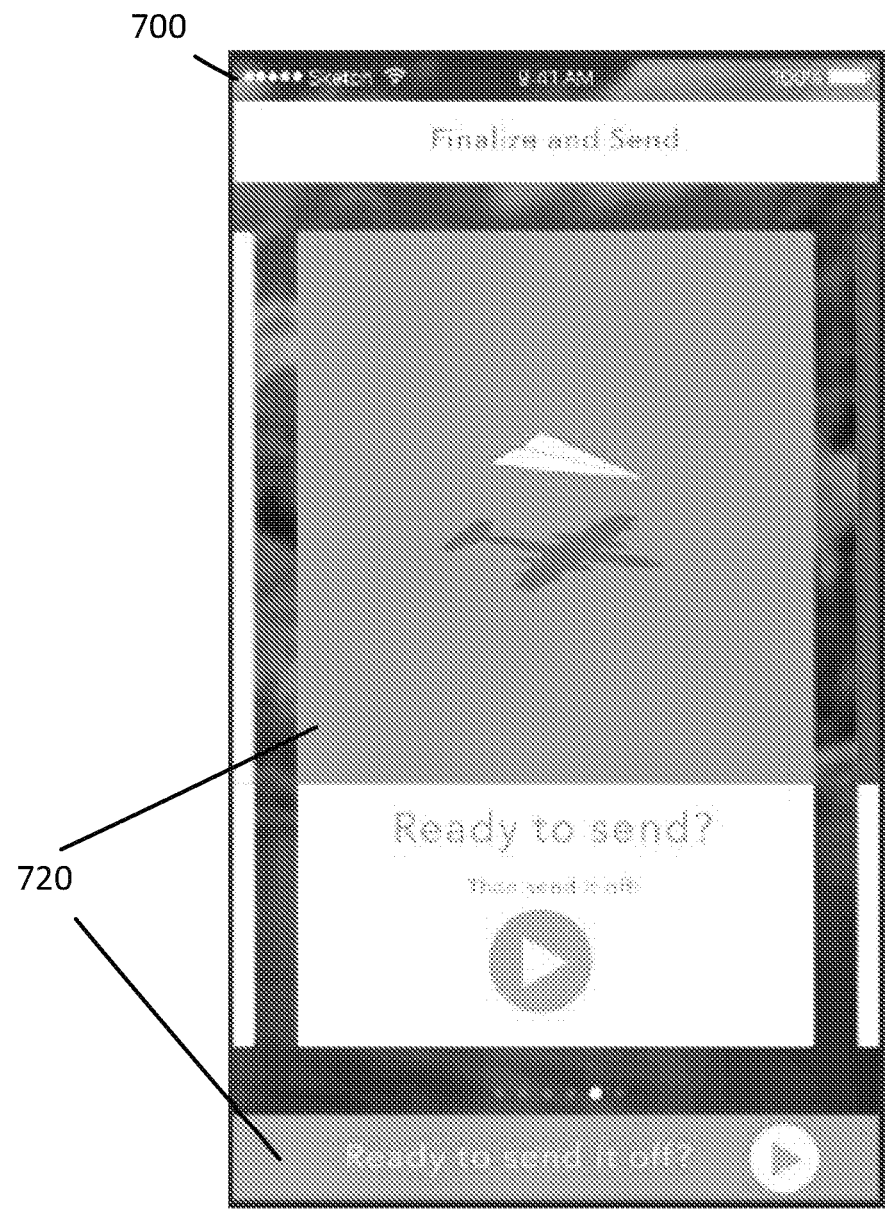

In some embodiments, the user can also be provided a UI screen similar to the UI 700 depicted in FIG. 7G. This enables the user a further opportunity to modify or send the message, via button 720, according to the input content and input attributes put forth in Steps 408-410 and reviewed in Step 412.

In Step 414, after the user has reviewed the message, as in Step 412, instructions to send the message to the recipient are received. Receiving the sending instructions causes the message to be locked according to the delivery conditions. Thus, as discussed above and in more detail below, the message can be unlocked and delivered to the identified recipient only upon the delivery condition being satisfied. In some embodiments, the locking of the message can involve the creation of locking data that is only unlocked upon the delivery condition being satisfied, which then triggers the message to be sent to the user, as discussed in more detail below. In some embodiments, the locking of the message can involve modifying or appending new data to the header of the message or encrypting the message, such that only upon the delivery condition being satisfied, is such data able to be read, thereby rendering the message deliverable to the recipient.

In Step 416, the message is saved in a database (e.g., database 320), which is associated with an application (or network or cloud) server associated with the Messaging engine 300. In some embodiments, storage of the created message involves storing, in accordance with the created data object in database 320, an identifier of the message in association with an identifier of the sending user. In some embodiments, the message can be retrieved from storage upon satisfaction of a delivery condition based on the identifier of the message and/or sender, as discussed in more detail below in relation to FIG. 5. In some embodiments, the saved message can also include an identifier of the recipient so that it can be retrieved for delivery to the recipient. Storage of the message, in some embodiments, only occurs after the user enters instructions to the send the message, as in Step 414 (e.g., storing a locked message).

According to some embodiments, storage/saving of the message can be part of the locking (and unlocking) schemes applied to the message to ensure that they are not only secured from unwanted viewers (e.g., hackers), but that they are also only (delivered and) viewable by the intended recipient upon the applied conditions being satisfied. As understood by those of skill in the art, storage of the message in a networked storage (e.g., application server 108 and storage 120, as in FIG. 1) involves an automatic encryption scheme that is inherently applied by the network storage. In some embodiments, additional security can be added to the stored/locked message such that upon the message being locked and stored, the message can also be encrypted (and only decrypted upon the delivery condition being satisfied). In some embodiments, the message can be encrypted according any known or to be known encryption or hash technology or protocol, such as, for example, a standard 128/256 bit AES (Advanced Encryption Standard) algorithm, approved by the NIST (National Institute of Standards and Technology), and uses both Symmetric and Asymmetric encryption/decryption keys.

In Step 418, upon saving the message, a notification message is automatically created and sent to the recipient. In some embodiments, the notification message is a push message that includes information identifying the sender of the message and that the message is locked until a delivery condition has been satisfied; and in some embodiments, the notification message can include additional content indicating what the delivery condition is. For example, as illustrated in FIG. 7A, a recipient user receives notification message 702 that indicates that locked messages have been sent to her and are available in her area (e.g., they can be unlocked by her visiting locations at or around her current location).

In a non-limiting example, using the Bob and Mary Starbucks® eGift example from above, Mary can receive notification message 702 on her device. The notification message can provide her with an indication that Bob has sent her a message and that if she physically visits the location associated with the Starbucks® (with a device "in hand" that is logged into the Messaging engine 300's application), there is a message waiting for her. In some embodiments, message 702 can prompt the user to open the application of the Messaging engine 300 in order to access the full details of the notification message 702, as discussed in more detail below in relation to FIG. 5.

According to some embodiments, Messaging engine 300 can provide further security control that prevents messages from being mass distributed to groups of users that should not receive such messages. For example, if a message is sent to a number of recipients exceeding a threshold, then the messages can be rejected, or subject to review, either by a user or a machine learning engine implemented by the Messaging engine 300 that analyzes the content of the message in order to determine its applicability to each recipient. For example, if a message is sent concerning a location within the next hour, and a number of users are not located in the same state, then those messages may be automatically deleted or halted from delivery (or storage) because there is no way for them to be at the location within the next hour. This avoids a situation where a user's Facebook® friends list is overused or misappropriated, as most users have a high number of friends that are not in the geographic location.

In some embodiments, further security can be provided such that if a user requests (i.e., sending user), upon entering the input from Step 408, to remain an anonymous sender of a message, the recipient can have the capability of requesting the identity of the sender prior to the message being delivered. In some embodiments, such functionality can be provided to the recipient from the received notification message, which enables the recipient to send a response message to the sender that the recipient is requesting the sender's identity. In some embodiments, if the sender refuses to identify themselves, the message is automatically deleted, or at least the recipient is granted the option to delete the message. In some embodiments, the sender can provide a context of the message. For example, using the Bob and Mary example above, Bob can indicate that he is "related to" or in "Mary's family" of friends should he want the eGift to be a surprise.

Turning to FIG. 5, Process 500 details steps performed in accordance with some embodiments of the present disclosure for receiving a message that is subject to preset real-world delivery conditions. It should be understood that while the discussion in Process 500 will be discussed in relation to receiving a single message from a single sender, it should not be construed as limiting, as functionality for receiving multiple messages from any number of senders, whether sent individually or as a group message would be understood by those of skill in the art as being implementable from the discussion herein.

Steps 502 and 518 performed by the notification module 308 of the Messaging engine 300; Steps 504 and 516 are performed by the display module 312; and Steps 506-514 are performed by the message retrieval module 310.

Process 500 begins with Step 502 where a recipient receives a notification message that a locked message has been sent to the recipient. As discussed above, the notification message the recipient receives is a push message sent to the recipient's device. Step 502 involves similar steps discussed above in relation to Step 418 and FIG. 7A.

In response to receiving the notification message in Step 502, the recipient can interact with the notification message in order to access its details. In some embodiments, if the recipient has an existing account with the messaging platform provided by the Messaging engine 300, then the user can open the message automatically by interacting with the message according to any known or to be known methodology of opening a notification message on a mobile device (e.g., swipe, double tap, and the like). In some embodiments, interacting with the received notification message may prompt the recipient to login to the application.

In embodiments where the recipient does not have an account, then the notification message can be formatted as a text message (e.g., SMS or MMS message sent to the recipient) that includes a uniform resource locator (URL), hyperlinked content or any other type of network resource locator that is associated with an application store from which the user can download the Messaging engine 300 application (referred to as an "app store locator"). In some embodiments, the notification message received in Step 502 (and sent in Step 418) can be modified to include the app store locator. Such modification can be a result of search of the database 320 that reveals that the recipient does not have an account (e.g., there is no identifier for the sender in database 320), and/or can be a result of a message to or search of the recipient's device that reveals the recipient's device does not have the application installed (e.g., a ping message is sent to the recipient's device and it is not returned).

In embodiments where the recipient is prompted to download the application, the recipient must then set up a profile, which is performed in a similar manner as discussed above in relation to Step 402-406, where a data object for the recipient is created, synchronized and stored in database 320, and includes data related to the recipient's login credentials and user information. In some embodiments, the creation of an account triggers a brief tutorial to be provided to the new user (e.g., recipient), which walks the recipient through the functionality of the application. In some embodiments, the tutorial can be its own locked and stored message that is unlocked upon the condition of a new account being created (which is created and stored according to Steps 408-418, as discussed above).

In Step 504, upon the recipient opening the application on their device, which as discussed above can be upon logging in or creating an account in response to receiving the notification message, a UI screen within the application can be displayed that displays a listing of some, if not all (as a scrollable screen) messages the user has received. This received message listing can include a prioritized listing of notification messages and unlocked messages. In some embodiments, the priority can be dynamically applied and maintained in accordance with any type of variable set by the sender, the recipient and/or a system administrator, which can include, but is not limited to, when the message was received, what type of condition is has applied therewith, the identity of the sender, the type of content included in the message, whether the message is a notification message or an unlocked message, and the like, or some combination thereof.

For example, if a priority setting dictates that messages that are unlocked are to be displayed above those that are locked, then upon a locked message unlocking, that message is automatically moved to the top of the queue. For example, if a recipient received a message that has a time period for delivery of two months, after two months have passed, that message will move from its current position in the listing to the top of the listing because its condition is now satisfied.

In another example, as illustrated in FIG. 7B, UI 700 is caused to be displayed on the recipient's device which displays a listing of messages that have been addressed and sent to the recipient—items 704a-704d. The listing is prioritized such that the order of the messages is based on how recent they were received, regardless of whether they are notification messages or unlocked messages. Therefore, for example, notification message 704a is displayed on top the list (or queue) because it was most recently received. In descending order of recency, notification message 704b, then unlocked messages 704c and 704d are displayed. Messages 704a and 704b are indicated as being notification messages associated with stored, locked messages that have yet to be delivered by the "locked lock" displayed in the interface area of the messages; and likewise, messages 704c and 704d are digital representations of unlocked, retrieved messages as indicated by the "unlocked lock" displayed in the interface area of the messages. Messages 704a and 704b are locked because the delivery condition for such messages has yet to be satisfied (e.g., the time, date and/or location applied by the sender has yet to occur); and messages 704c and 704d are unlocked because the delivery condition for such messages has occurred, as discussed in more detail below in relation to Steps 506-516.

The UI 700 in FIG. 7B also includes a "Send" button, which upon selection enables the recipient to draft their own secure message according to Process 400, as outlined above, and delivered according to Process 500, as discussed herein.

In Steps 506-510, delivery conditions for messages are monitored in order to determine when stored, locked messages in the database are to be delivered. In some embodiments, Steps 506-510 are performed concurrently, and in some embodiments, they are performed individually, or some combination thereof. In some embodiments, the monitoring occurring in Steps 506-510 can be based on tracked activity of the recipient (e.g., status information of the recipient and/or recipient's device) and/or tracking of the time and/or date variables of the real-world or those associated with a message. For example, the application server associated with the Messaging engine 300 can request, ping, receive or otherwise avail itself to data of a recipient's device in order to track its activity. In some embodiments, the monitoring in Steps 506-510 can be performed by the recipient's device periodically, or continuously, communicating data respective to its time, date and/or geographic locational values to the application server.

In Step 512, analysis of the data identified during the monitoring occurring in Steps 506-510 is performed and a determination is made regarding whether any of the delivery conditions for the message(s) the recipient has received have been satisfied. In some embodiments, the analysis in Step 512 can involve parsing the data identified during the monitoring and searching for time, date and/or location data that matches (in some embodiments to a threshold value) time, date and/or location data of a locked message. In some embodiments, the determination in Step 512 can be performed by the application server or the recipient's device, or some combination thereof. If there is no match, then Process 500 repeats steps 506-510 as indicated in FIG. 5. If a match is determined in Step 512, then Process 500 proceeds to Step 514.

In Step 514, the locked message sent by the sender (from Process 400 discussed above) is unlocked, retrieved and sent to the recipient's device. As discussed above, only upon the message's applied real-world condition being satisfied is the message actually delivered to the recipient's device. As discussed above, the unlocking of the message can include decrypting the message, which can involve decrypting the encryption applied by the network storage, and/or decrypting the encryption additionally applied upon storing the message. In some embodiments, the decryption can occur at the server prior to transmission to the recipient's device, and in some embodiments, the decryption can occur at the recipient's device, such that the encrypted message is sent to the recipient's device with a key, and the key is used locally on the recipient's device to decrypt the message.

In some embodiments, a version of the locked message may already be sent to the recipient's device as part of a package that includes the notification message sent in Step 502. Thus, upon the delivery condition be satisfied, the message can be locally unlocked without a need for communication with a server. In such embodiments, the version of locked message that is stored on the recipient's device is encrypted and decrypted in a similar manner as discussed above.

In some embodiments, identification of the locked message in storage for purposes of unlocking the message in Step 514 is based on data that identifies the message in storage and indicates that it is to be unlocked. Such data can be derived, determined or otherwise identified from the identifier of the notification message and/or an identifier or data associated with the delivery condition being satisfied. For example, the locked message can be identified, unlocked and retrieved by identifying the stored message in the database according to the message identifier, which is associated with the delivery condition stored therewith, such that upon the condition(s) for the message being satisfied, data is sent to the database identifying the satisfaction of the condition which triggers the message to be decrypted, as discussed above.

In Step 516, the unlocked and retrieved message is communicated from the server to the recipient device and displayed within a UI display of the Messaging engine 300 application. In embodiments where the message already resides on the recipient device, the message is identified and caused to be displayed by the Messaging engine 300. In some embodiments, the display of an unlocked version is displayed in a similar manner as the display of the interface elements 704c and 704d, as illustrated in FIG. 7B, where there is an indication that the messages are unlocked and ready for viewing. In some embodiments, the display of the unlocked message can involve automatically displaying on the recipient's device the opened message. The display of the unlocked opened message has the appearance (e.g., content, order, format and layout) according to the appearance set by the sending user in Steps 412-414 and FIG. 7E, as discussed above.

By way of example, illustrating a non-limiting embodiment of the performance by the Messaging engine 300 of Steps 506-516, if a stored message is to be unlocked upon a set time (e.g., 1:00 pm), then execution of Steps 506 and 512 by the Messaging engine 300 cause the identification that such time has occurred, which then causes the stored message to be unlocked (e.g., decrypted) and retrieved from storage, as discussed above. This causes the Messaging engine 300 to display the message on a display of the recipient's device.

By way of another non-limiting example embodiment, if a stored message is to be unlocked upon a set time and date (e.g., 1:00 pm on Wednesday, Jan. 11, 2017), then execution of Steps 506, 508 and 512 by the Messaging engine 300 cause the identification that such time and date have occurred, which then causes the stored message to be unlocked (e.g., decrypted), retrieved from storage and displayed on the recipient's device.

In yet another non-limiting example embodiment, if a stored message is to be unlocked upon the recipient's device being at a specific location (e.g., 40.748441, 73.985664 (i.e., the latitude and longitude for the Empire State Building in New York, N.Y.)), then execution of Steps 510 and 512 by the Messaging engine 300 cause the determination that the recipient's device is at or around (within a proximity) to such location, which then causes the stored message to be unlocked (e.g., decrypted), retrieved from storage and displayed on the recipient's device.

In Step 518, according to some embodiments, a message can be created and sent to the sender that the message was viewed by the recipient. Such message can be created upon the message's condition(s) being satisfied (even if the recipient has yet to view the message) or upon the message being actually viewed by the recipient. In some embodiments, the message to the sender can be automatically created by the Messaging engine 300, which includes information that the recipient viewed the message, and in some embodiments, the context upon such viewing (e.g., where, when and how the message was viewed). In some embodiments, the message to the sender can be drafted by the recipient within the Messaging engine 300 application. In some embodiments, the response message by the recipient can be sent to the sender according to the steps outlined in Process 400 discussed above.

In some embodiments, as discussed above, the recipient can save the message after viewing the message; and in some embodiments, the recipient can dispose of (or delete) the message. In some embodiments, a viewed message can be automatically deleted, and such automatic deletion can be according to a predetermined period of time expiring after viewing occurred, or upon the message being viewed then closed. In some embodiments, the message can be automatically saved upon viewing.

In some embodiments, as discussed above, the received message can be shared, posted, responded to, or otherwise communicated over any type of messaging protocol or social networking platform that enables message content to be attached to a message (e.g., in a similar manner how Twitter® messages can link to Instagram® pictures, Twitter® messages, for example, can link or include received messages). In some embodiments, the delivery conditions set by the sending user can also restrict how, when, where and with whom their created messages are shared, and such restrictions can be set when providing the input attributes in Step 410. For example, a sender of a message can state that after a message is unlocked, it cannot be posted on another social networking platform, and upon an attempt to do so, the sender can be notified or the message can automatically expire (or be deleted).

Turning to FIG. 6, Process 600 details steps performed in accordance with some embodiments of the present disclosure for creating or drafting, and then sending a legacy message to a recipient. As discussed above, a legacy message can be a message that has a delivery condition set according to a future event, which has, at the time of creation, an undefined (or unknown) time, date and/or geographic location. For legacy messages, however, the delivery condition is only satisfied upon the event data for the message being determined then satisfied. As discussed herein, the event data can be determined upon analysis of users' activity, profiles, calendars, timelines, messages and the like, which provides the information for when the event is to occur. An example of this is the Luke college graduation example discussed above (referred to as the "Rich/Luke example"). Embodiments of the actual delivery of the legacy message are discussed above in relation to FIG. 5.

Steps 602-608 and 614-616 are performed by the message creation module 304 of the Messaging engine 300; Steps 610 and 618 are performed by the storage module 306; and Steps 612 is performed by the notification module 308. Process 600 begins with Step 602 wherein input content corresponding to a draft legacy message is received. Step 602 is performed in a similar manner as discussed above in relation to Step 408 of FIG. 4.

In Step 604, input corresponding to a future event is received. As discussed above, this input can include any form of electronic data indicating a future event, such as, for example, text, media, a character string, a geographic location, a voice note, and the like. This future event serves as the delivery condition, such that only upon the occurrence of future event occurring will the message be delivered to the identified recipient. Thus, Process 600 discussed herein provides an "event bound" embodiment that enables a user to create a message having a delivery condition for a future event, even though the date, time and/or location of the future event may not be known at the time of the message creation. The event input received in Step 604 is received in a similar manner as discussed above in relation to Step 410 of Process; however, this input does not include an exact time, date or location, or in some embodiments, any time, date or location information—rather, it includes information about a future event that is to occur (or is expected to or may occur).

As discussed in the above Rich/Luke example, Rich would not know the date of Luke's college graduation (or the location), yet he was able to draft the message and have it saved in the database for later population of the delivery conditions associated with the graduation date/time/location, as discussed herein.

The message preview, sending instructions and storage of the created message occurring in Steps 606-610 of Process 600 are then performed in a similar manner as in Steps 412-416 of Process 400 discussed above. The notification message being sent in Step 612 is performed in a similar manner as discussed above in relation to Step 418 of FIG. 4; however, instead of the time, date and/or location of the delivery condition being provided in the notification message, as included in the message of Step 418, in Step 612 the notification message provides an indication of the future event. Using the Rich/Luke example from above, Luke can receive a message that states that upon his college graduation, his grandfather has some advice for him.

In Step 614, the Messaging engine 300 then mines data available to the network server based on the event input in order to identify information that can be used to populate the delivery condition variables of the event. In some embodiments, Step 614 can involve the Messaging engine monitoring and/or periodically searching and/or analyzing networked resources for information that can be used to determine the time, date and/or location of the future event (e.g. Luke's graduation). These networked resources can include information derived, determined, extracted or otherwise identified from, but not limited to, calendar data of users, timeline data of users, social network feeds, photo sites, news sources, blogs, messages, profile information, locational data, and the like, or some combination thereof. The users' information leveraged to identify the event data can be based on information of a sending user, a recipient user, and/or friends or other users in the sending and/or recipient user's networks. The resources of data/information and the networks hosting such resources can be associated with or otherwise in communication with the Messaging engine 300, or can be servers, systems and/or platforms of third parties. Thus, as a result of Step 614, the Messaging engine 300 can then determine information indicating a time, date and/or location of the event. Step 616.

For example, using the Rich/Luke example, the Messaging engine 300 can analyze the calendar application running on Luke's mobile phone to determine that he has just input a calendar event indicating his graduation date from college. In another example, the application hosted by the Messaging engine 300 may have calendar functionality, and in a similar manner, the graduation date can be extracted. In yet another example, messages sent from Luke to his parents via the Messaging engine 300, or by other applications (e.g., WhatsApp, and the like) can include content that indicates he is graduating (e.g., Luke can send an invite message "I am graduating!!! Hope to see you there on May 20, 2039). In another example, the Messaging engine 300 and/or other applications can have a "timeline" feature (e.g., social network feed or timeline, such as Facebook's timeline) which can be accessed or mined to extract data or information relating to or representing life events that can be used to trigger the release of legacy message. This type of data can be periodically gathered and analyzed and upon determination that an event's time, date and/or location can be known from the data, the event occurrence can be determined and used by the Messaging engine 300 to send a legacy message.

In some embodiments, the monitoring, searching and/or analysis occurring in Step 614 can be based on a particular event, whereby the event associated with a saved message can serve as a query for identifying the attributes of the event. In some embodiments, the monitoring, searching and/or analysis can be independent of saved legacy messages, such that upon identifying an event, a comparison of the identified event data to stored legacy messages can occur, thereby causing the determination of information confirming the event.

In Step 618, upon the time, date and/or location information of the event being determined, as in Steps 614-616, this information can be communicated to the database for updating of the stored, locked message. This involves updating the data object in the database that contains the information of the event, such that the event is not simply an identified future occasion, but rather is now tied to a specific delivery condition in the form of a specific time value, date value and/or location value (which are input in a similar manner as discussed above in relation to Step 410 discussed above). In some embodiments, an updated notification message can be sent to the recipient.

As a result of the created, stored and updated legacy message discussed herein, the legacy message can then be delivered in a similar manner as discussed above in relation to FIG.

Figure 8:
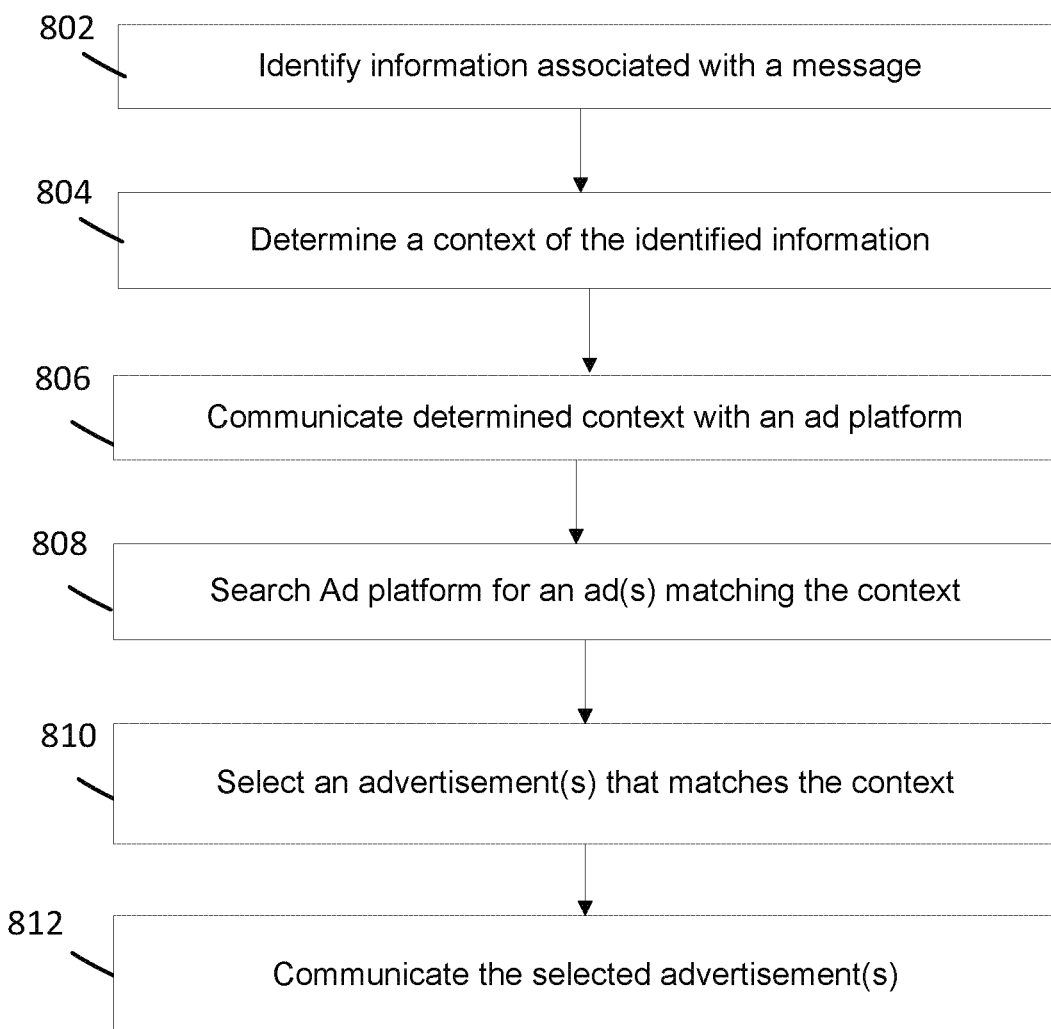
FIG. 8 is a flowchart illustrating steps performed in accordance with some embodiments of the present disclosure.

FIG. 8 is a work flow example 800 for serving relevant digital media content associated with or comprising advertisements (e.g., digital advertisement content) based on the information associated with a message delivery, as discussed above in relation to FIGS. 3-7G. Such information, referred to as "message information" for reference purposes only, can include, but is not limited to, the content of a message, the sender of the message, the recipient(s) of the message, location of the sender and/or recipient, location condition of the message, time and/or date condition of the message, and the like, and/or some combination thereof.

As discussed above, reference to an "advertisement" should be understood to include, but not be limited to, digital media content that provides information provided by another user, service, third party, entity, and the like. Such digital ad content can include any type of known or to be known media renderable by a computing device, including, but not limited to, video, text, audio, images, and/or any other type of known or to be known multi-media. In some embodiments, the digital ad content can be formatted as hyperlinked multi-media content that provides deep-linking features and/or capabilities. Therefore, while the content is referred as an advertisement, it is still a digital media item that is renderable by a computing device, and such digital media item comprises digital content relaying promotional content provided by a network associated third party.

In Step 802, message information is identified. As discussed above, the message information can be based any of the information from processes outlined above with respect to FIGS. 3-7G. For purposes of this disclosure, Process 800 will refer to single message being sent from a sender to a recipient as the basis for serving a digital advertisement(s); however, it should not be construed as limiting, as any number of messages and information associated therewith, as well as programs used and/or content items included therein during such messaging can form such basis, without departing from the scope of the instant disclosure.

In Step 804, a context is determined based on the identified message information. This context forms a basis for serving advertisements related to the message information. In some embodiments, for example, the context can be determined by determining a type of content identified within an identified message item. In some embodiments, in another example, the context can be based on a determined category which the message information of Step 802 represents. For example, a message can include a video file corresponding to the recipient's $40^{th}$ birthday party, whereby the determined category can be associated with a category of content corresponding to "birthdays;" therefore, the context identified in Step 804 can be related to "birthdays" or other "celebrations" and can be leveraged in order to identify digital ad content of interest, as discussed herein in relation to the steps of Process 800. In some embodiments, in yet another non-limiting example, the context can be based on a location condition for the message to be delivered—for example, if the message is delivered upon the user being at the Eifel Tower, the context can be in accordance with information about the "Eifel Tower" or "Paris, France." In some embodiments, the identification of the context from Step 804 can occur before, during and/or after the analysis detailed above with respect to Processes 400 and 500, or some combination thereof.

In Step 806, the determined context is communicated (or shared) with an advertisement platform comprising an advertisement server 130 and ad database. Upon receipt of the context, the advertisement server 130 performs (e.g., is caused to perform as per instructions received from the device(s) executing the Messaging engine 300) a search for a relevant advertisement within the associated ad database. The search for an advertisement is based at least on the identified context.

In Step 808, the advertisement server 130 searches the ad database for a digital advertisement(s) that matches the identified context. In Step 810, an advertisement is selected (or retrieved) based on the results of Step 808. In some embodiments, the selected advertisement can be modified to conform to attributes or capabilities of the message, application, page, interface, platform, or method upon which it will be displayed, and/or to the application and/or device for which it will be displayed within. In some embodiments, the selected advertisement is shared or communicated via the application the user is utilizing to view, retrieve, send and/or render messages or media. Step 812. In some embodiments, the selected advertisement is sent directly to each user's computing device. In some embodiments, the selected advertisement is displayed within a portion of the interface of the application used to display the message, and/or within an overlaying or pop-up interface associated with the messaging interface used to view messages.

Figure 9:
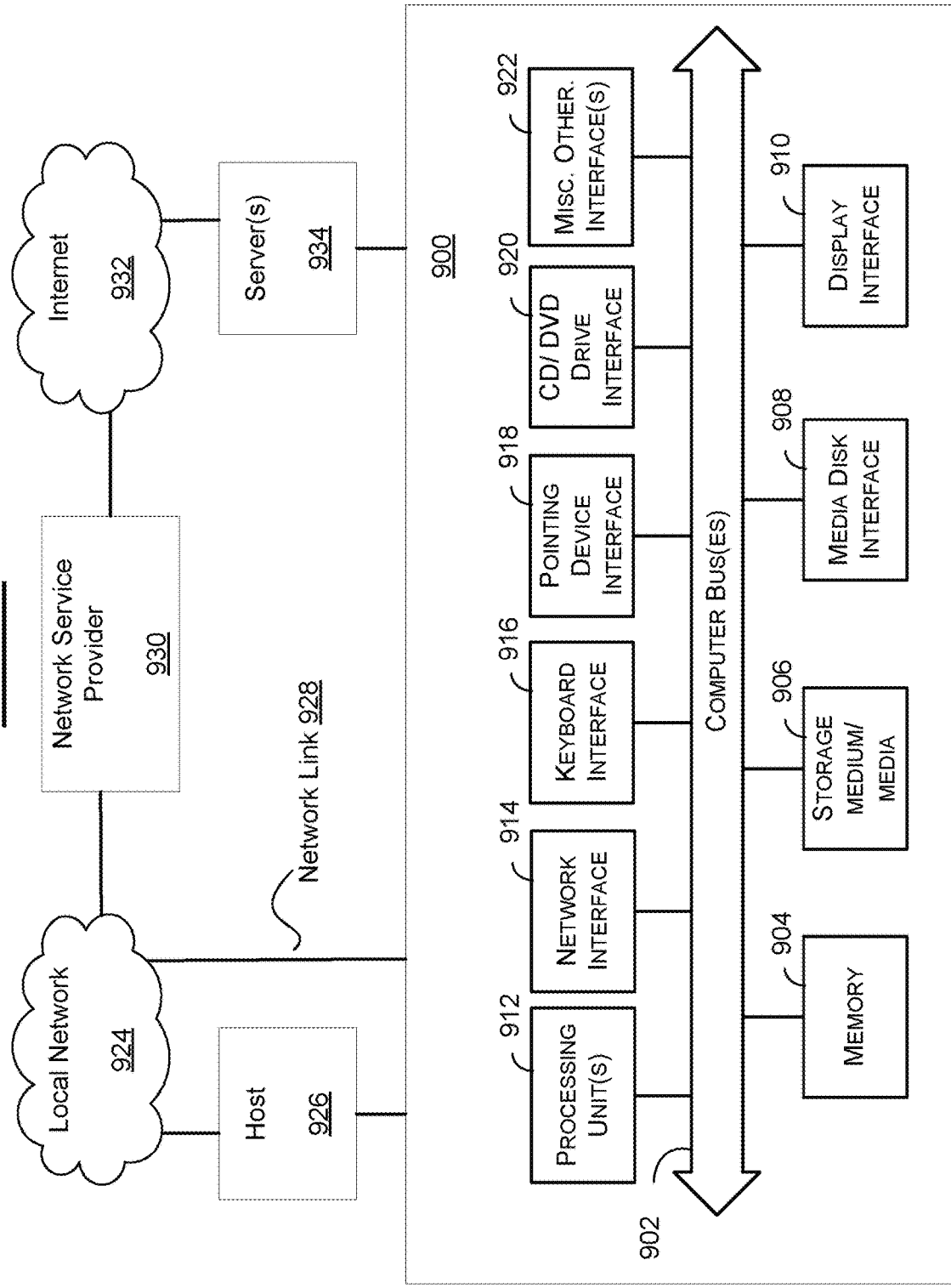
FIG. 9 is a block diagram illustrating the architecture of an exemplary hardware device in accordance with one or more embodiments of the present disclosure.

As shown in FIG. 9, internal architecture 900 of a computing device(s), computing system, computing platform and the like includes one or more processing units, processors, or processing cores, (also referred to herein as CPUs) 912, which interface with at least one computer bus 902. Also interfacing with computer bus 902 are computer-readable medium, or media, 906, network interface 914, memory 904, e.g., random access memory (RAM), run-time transient memory, read only memory (ROM), media disk interface 908 and/or media disk drive interface 920 as an interface for a drive that can read and/or write to media including removable media such as floppy, CD-ROM, DVD, media, display interface 910 as interface for a monitor or other display device, keyboard interface 916 as interface for a keyboard, pointing device interface 918 as an interface for a mouse or other pointing device, and miscellaneous other interfaces 922 not shown individually, such as parallel and serial port interfaces and a universal serial bus (USB) interface.

Memory 904 interfaces with computer bus 902 so as to provide information stored in memory 904 to CPU 912 during execution of software programs such as an operating system, application programs, device drivers, and software modules that comprise program code, and/or computer executable process steps, incorporating functionality described herein, e.g., one or more of process flows described herein. CPU 912 first loads computer executable process steps from storage, e.g., memory 904, computer readable storage medium/media 906, removable media drive, and/or other storage device. CPU 912 can then execute the stored process steps in order to execute the loaded computer-executable process steps. Stored data, e.g., data stored by a storage device, can be accessed by CPU 912 during the execution of computer-executable process steps.

Persistent storage, e.g., medium/media 906, can be used to store an operating system and one or more application programs. Persistent storage can also be used to store device drivers, such as one or more of a digital camera driver, monitor driver, printer driver, scanner driver, or other device drivers, web pages, content files, playlists and other files. Persistent storage can further include program modules and data files used to implement one or more embodiments of the present disclosure, e.g., listing selection module(s), targeting information collection module(s), and listing notification module(s), the functionality and use of which in the implementation of the present disclosure are discussed in detail herein.

Network link 928 typically provides information communication using transmission media through one or more networks to other devices that use or process the information. For example, network link 928 may provide a connection through local network 924 to a host computer 926 or to equipment operated by a Network or Internet Service Provider (ISP) 930. ISP equipment in turn provides data communication services through the public, worldwide packet-switching communication network of networks now commonly referred to as the Internet 932.

A computer called a server host 934 connected to the Internet 932 hosts a process that provides a service in response to information received over the Internet 932. For example, server host 934 hosts a process that provides information representing image and/or video data for presentation at display 910. It is contemplated that the components of system 900 can be deployed in various configurations within other computer systems, e.g., host and server.

At least some embodiments of the present disclosure are related to the use of computer system 900 for implementing some or all of the techniques described herein. According to one embodiment, those techniques are performed by computer system 900 in response to processing unit 912 executing one or more sequences of one or more processor instructions contained in memory 904. Such instructions, also called computer instructions, software and program code, may be read into memory 904 from another computer-readable medium 906 such as storage device or network link. Execution of the sequences of instructions contained in memory 904 causes processing unit 912 to perform one or more of the method steps described herein. In alternative embodiments, hardware, such as ASIC, may be used in place of or in combination with software. Thus, embodiments of the present disclosure are not limited to any specific combination of hardware and software, unless otherwise explicitly stated herein.

The signals transmitted over network link and other networks through communications interface, carry information to and from computer system 900. Computer system 900 can send and receive information, including program code, through the networks, among others, through network link and communications interface. In an example using the Internet, a server host transmits program code for a particular application, requested by a message sent from computer, through Internet, ISP equipment, local network and communications interface. The received code may be executed by processor 902 as it is received, or may be stored in memory 904 or in storage device or other non-volatile storage for later execution, or both.

For the purposes of this disclosure a module is a software, hardware, or firmware (or combinations thereof) system, process or functionality, or component thereof, that performs or facilitates the processes, features, and/or functions described herein (with or without human interaction or augmentation). A module can include sub-modules. Software components of a module may be stored on a computer readable medium for execution by a processor. Modules may be integral to one or more servers, or be loaded and executed by one or more servers. One or more modules may be grouped into an engine or an application.

For the purposes of this disclosure the term "user", "subscriber" "consumer" or "customer" should be understood to refer to a user of an application or applications as described herein and/or a consumer of data supplied by a data provider. By way of example, and not limitation, the term "user" or "subscriber" can refer to a person who receives data provided by the data or service provider over the Internet in a browser session, or can refer to an automated software application which receives the data and stores or processes the data.

Those skilled in the art will recognize that the methods and systems of the present disclosure may be implemented in many manners and as such are not to be limited by the foregoing exemplary embodiments and examples. In other words, functional elements being performed by single or multiple components, in various combinations of hardware and software or firmware, and individual functions, may be distributed among software applications at either the client level or server level or both. In this regard, any number of the features of the different embodiments described herein may be combined into single or multiple embodiments, and alternate embodiments having fewer than, or more than, all of the features described herein are possible.

Functionality may also be, in whole or in part, distributed among multiple components, in manners now known or to become known. Thus, myriad software/hardware/firmware combinations are possible in achieving the functions, features, interfaces and preferences described herein. Moreover, the scope of the present disclosure covers conventionally known manners for carrying out the described features and functions and interfaces, as well as those variations and modifications that may be made to the hardware or software or firmware components described herein as would be understood by those skilled in the art now and hereafter.

Furthermore, the embodiments of methods presented and described as flowcharts in this disclosure are provided by way of example in order to provide a more complete understanding of the technology. The disclosed methods are not limited to the operations and logical flow presented herein. Alternative embodiments are contemplated in which the order of the various operations is altered and in which sub-operations described as being part of a larger operation are performed independently.

While various embodiments have been described for purposes of this disclosure, such embodiments should not be deemed to limit the teaching of this disclosure to those embodiments. Various changes and modifications may be made to the elements and operations described above to obtain a result that remains within the scope of the systems and processes described in this disclosure.

What is claimed is:

1. A method comprising:
receiving, at an application server associated with a messaging application, a message from first user, said message comprising digital content and information identifying contact information of a second user, said message further comprising information indicating a delivery condition set by the first user, said delivery condition comprising an undefined delivery condition variable corresponding to a future event associated with the second user;
upon receiving the message, locking, by the application server, the received message such that the message is only deliverable to the second user upon satisfaction of the delivery condition, said locking further comprising storing the locked message in an associated database;
mining, via the application server, data available on a network associated with the second user based on the delivery condition information, said mining comprising analyzing said second user data, and based on said analysis, identifying event data corresponding to said future event;
modifying, via the application server, said locked message based on said mining, said modifying comprising defining the delivery condition variable for said locked message based on said event data;
determining, via the application server, that said delivery condition is satisfied based on said future event occurring; and
unlocking the locked message saved in storage, and communicating, via the application server, the unlocked message to a device of the second user.

2. The method of claim 1, wherein said data available on the network associated with the second user comprises networked resources consisting of: calendar data of users, timeline data of users, social network feeds, photo site data of users, news sources, messages of users, profile information of the second user and geographical locational data of the second user.

3. The method of claim 1, wherein the identified event data comprises information related to at least one of a time, date and geographical location of the future event.

4. The method of claim 1, further comprising:
monitoring, via the application server, said data available to the network associated with the second user; and
gathering, based on said monitoring, additional data related to the second user based on said monitoring, wherein said mining is performed based on said monitoring.

5. The method of claim 4, wherein said mining is performed periodically by said application server.

6. The method of claim 4, further comprising:
parsing said additional data, and based on said parsing, analyzing the parsed data, wherein said analysis of the second user data is based on said parsed analysis of the additional data.

7. The method of claim 1, further comprising:
communicating information related to a user interface (UI) that is to be displayed on a display of a device of the first user, said UI displaying a preview version of the received message, said preview version being an interactive, dynamically modifiable version of the message comprising a plurality of portions respectively displaying information associated with the second user, the digital content and the delivery condition.

8. The method of claim 1, further comprising:
communicating a notification message to a device of the second user upon said satisfaction of the delivery condition, said notification message comprising an identifier of the first user and information indicating said event data of the future event.

9. The method of claim 1, further comprising:
determining a context of the digital content in said unlocked message;
causing communication, over the network, of said context to an advertisement platform to obtain a digital content item comprising digital advertisement content associated with said context;
receiving, over the network, said digital content item; and
communicating said digital content item to the second user along with said unlocked message.

10. A non-transitory computer-readable storage medium tangibly encoded with computer-executable instructions, such that when an application server executes the instructions, a method is performed comprising:
receiving, at the application server associated with a messaging application, a message from first user, said message comprising digital content and information identifying contact information of a second user, said message further comprising information indicating a delivery condition set by the first user, said delivery condition comprising an undefined delivery condition variable corresponding to a future event associated with the second user;
upon receiving the message, locking, by the application server, the received message such that the message is only deliverable to the second user upon satisfaction of the delivery condition, said locking further comprising storing the locked message in an associated database;
mining, via the application server, data available on a network associated with the second user based on the delivery condition information, said mining comprising analyzing said second user data, and based on said analysis, identifying event data corresponding to said future event;
modifying, via the application server, said locked message based on said mining, said modifying comprising defining the delivery condition variable for said locked message based on said event data;
determining, via the application server, that said delivery condition is satisfied based on said future event occurring; and
unlocking the locked message saved in storage, and communicating, via the application server, the unlocked message to a device of the second user.

11. The non-transitory computer-readable storage medium of claim 10, wherein said data available on the network associated with the second user comprises networked resources consisting of: calendar data of users, timeline data of users, social network feeds, photo site data of users, news sources, messages of users, profile information of the second user and geographical locational data of the second user.

12. The non-transitory computer-readable storage medium of claim 10, wherein the identified event data comprises information related to at least one of a time, date and geographical location of the future event.

13. The non-transitory computer-readable storage medium of claim 10, further comprising:
monitoring, via the application server, said data available to the network associated with the second user; and
gathering, based on said monitoring, additional data related to the second user based on said monitoring, wherein said mining is performed based on said monitoring.

14. The non-transitory computer-readable storage medium of claim 13, wherein said mining is performed periodically by said application server.

15. The non-transitory computer-readable storage medium of claim 13, further comprising:
parsing said additional data, and based on said parsing, analyzing the parsed data, wherein said analysis of the second user data is based on said parsed analysis of the additional data.

16. The non-transitory computer-readable storage medium of claim 10, further comprising:
communicating information related to a user interface (UI) that is to be displayed on a display of a device of the first user, said UI displaying a preview version of the message, said preview version being an interactive, dynamically modifiable version of the message comprising a plurality of portions respectively displaying information associated with the second user, the digital content and the delivery condition.

17. The non-transitory computer-readable storage medium of claim 10, further comprising:
communicating a notification message to a device of the second user upon said satisfaction of the delivery condition, said notification message comprising an identifier of the first user and information indicating said future event.

18. An application server comprising:
a processor;
a non-transitory computer-readable storage medium for tangibly storing thereon program logic for execution by the processor, the program logic comprising:
logic executed by the processor for receiving, at the application server associated with a messaging application, a message from first user, said message comprising digital content and information identifying contact information of a second user, said message further comprising information indicating a delivery condition set by the first user, said delivery condition comprising an undefined delivery condition variable corresponding to a future event associated with the second user;
logic executed by the processor for upon receiving the message, locking, by the application server, the received message such that the message is only deliverable to the second user upon satisfaction of the delivery condition, said locking further comprising storing the locked message in an associated database;
logic executed by the processor for mining, via the application server, data available on a network associated with the second user based on the delivery condition information, said mining comprising analyzing said second user data, and based on said analysis, identifying event data corresponding to future event;
logic executed by the processor for modifying, via the application server, said locked message based on said mining, said modifying comprising defining the delivery condition variable for said locked message based on said event data;
logic executed by the processor for determining, via the application server, that said delivery condition is satisfied based on said future event occurring; and
logic executed by the processor for unlocking the locked message saved in storage, and communicating, via the application server, the unlocked message to a device of the second user.

19. The application server of claim 18, further comprising:
logic executed by the processor for monitoring, via the application server, said data available to the network associated with the second user;
logic executed by the processor for gathering, based on said monitoring, additional data related to the second user based on said monitoring; and
logic executed by the processor for parsing said additional data, and based on said parsing, analyzing the parsed data, wherein said analysis of the second user data is based on said parsed analysis of the additional data.

20. The application server of claim 18, further comprising:
logic executed by the processor for communicating a notification message to a device of the second user upon said satisfaction of the delivery condition, said notification message comprising an identifier of the first user and information indicating said future event.

* * * * *